(12) United States Patent
Chen et al.

(10) Patent No.: US 12,300,847 B2
(45) Date of Patent: May 13, 2025

(54) BOX BODY, BATTERY, ELECTRIC APPARATUS AND MANUFACTURING METHOD OF THE BATTERY

(71) Applicant: JIANGSU CONTEMPORARY AMPEREX TECHNOLOGY LIMITED, Liyang (CN)

(72) Inventors: Zhiming Chen, Liyang (CN); Hui Yang, Liyang (CN)

(73) Assignee: JIANGSU CONTEMPORARY AMPEREX TECHNOLOGY LIMITED, Jiangsu (CN)

( * ) Notice: Subject to any disclaimer, the term of this patent is extended or adjusted under 35 U.S.C. 154(b) by 733 days.

(21) Appl. No.: 17/552,827

(22) Filed: Dec. 16, 2021

(65) Prior Publication Data

US 2022/0158296 A1    May 19, 2022

Related U.S. Application Data

(63) Continuation of application No. PCT/CN2020/128859, filed on Nov. 13, 2020.

(51) Int. Cl.
*H01M 50/358* (2021.01)
*H01M 10/613* (2014.01)
(Continued)

(52) U.S. Cl.
CPC ....... *H01M 50/358* (2021.01); *H01M 10/613* (2015.04); *H01M 10/625* (2015.04);
(Continued)

(58) Field of Classification Search
CPC ............. H01M 50/358; H01M 10/613; H01M 10/625; H01M 10/647; H01M 10/6556;
(Continued)

(56) References Cited

U.S. PATENT DOCUMENTS

2004/0197620 A1   10/2004  Arthur
2011/0027631 A1    2/2011  Koenigsmann
(Continued)

FOREIGN PATENT DOCUMENTS

CN    202121030 U    1/2012
CN    103066225 A    4/2013
(Continued)

OTHER PUBLICATIONS

First Office Action dated Nov. 28, 2022 received in Chinese Patent Application No. CN 202110338126.X.
(Continued)

*Primary Examiner* — Jonathan G Leong
*Assistant Examiner* — John S Medley
(74) *Attorney, Agent, or Firm* — Scully, Scott, Murphy & Presser, P.C.

(57) ABSTRACT

A box body, a battery, an electric apparatus and a manufacturing method of the battery, belonging to the field of energy storage devices. The box body includes a cooling device and a plurality of walls, where the plurality of walls enclose an accommodating space for accommodating a battery cell, an interior of at least one wall is provided with a first flow channel, and the first flow channel is used for discharging emissions generated by thermal runaway of the battery cell out of the box body. The cooling device is arranged in the first flow channel and used for cooling the emissions flowing through the cooling device. The cooling effect of the cooling device becomes better, the possibility of firing and burning of the emissions is reduced, and the safety of the battery is improved.

19 Claims, 14 Drawing Sheets

(51) Int. Cl.
*H01M 10/625* (2014.01)
*H01M 10/647* (2014.01)
*H01M 10/6556* (2014.01)

(52) U.S. Cl.
CPC ..... *H01M 10/647* (2015.04); *H01M 10/6556* (2015.04); *H01M 2220/20* (2013.01)

(58) Field of Classification Search
CPC ... H01M 50/35; H01M 50/367; H01M 50/383
USPC .......................................................... 429/88
See application file for complete search history.

(56) References Cited

U.S. PATENT DOCUMENTS

| | | | |
|---|---|---|---|
| 2011/0206968 | A1 | 8/2011 | Nishimura et al. |
| 2019/0097192 | A1* | 3/2019 | Kim .................... H01M 50/394 |
| 2019/0123316 | A1 | 4/2019 | Endres et al. |
| 2019/0173074 | A1 | 6/2019 | Ogawa et al. |
| 2021/0066690 | A1* | 3/2021 | Gondoh ............. H01M 50/367 |
| 2021/0359374 | A1* | 11/2021 | Reinprecht ......... H01M 50/358 |
| 2023/0019147 | A1* | 1/2023 | Geisler ............... H01M 50/394 |

FOREIGN PATENT DOCUMENTS

| | | | | | |
|---|---|---|---|---|---|
| CN | 104051813 | A | | 9/2014 | |
| CN | 105742759 | A | | 7/2016 | |
| CN | 106605315 | A | | 4/2017 | |
| CN | 206350877 | U | | 7/2017 | |
| CN | 207409561 | U | | 5/2018 | |
| CN | 109546262 | A | | 3/2019 | |
| CN | 209766599 | U | | 12/2019 | |
| CN | 111416082 | A | | 7/2020 | |
| CN | 111584792 | A | | 8/2020 | |
| CN | 111668406 | A | | 9/2020 | |
| CN | 211798393 | U | | 10/2020 | |
| DE | 102014206058 | A1 | * | 10/2015 | ........ H01M 50/3425 |
| GB | 2516120 | A | * | 1/2015 | ............ B60L 11/18 |
| JP | 2000064375 | A | | 2/2000 | |
| JP | 2007027011 | A | | 2/2007 | |
| JP | 2010539667 | A | | 12/2010 | |
| JP | 2016136193 | A | | 7/2016 | |
| JP | 2018527704 | A | | 9/2018 | |
| JP | 2020077507 | A | | 5/2020 | |
| JP | 2020149900 | A | | 9/2020 | |
| KR | 20180006150 | A | | 1/2018 | |
| WO | WO-2019176415 | A1 | * | 9/2019 | ......... H01M 50/202 |
| WO | 2020039722 | A1 | | 2/2020 | |
| WO | 2020166940 | A1 | | 8/2020 | |
| WO | WO-2024053839 | A1 | * | 3/2024 | ......... H01M 50/367 |

OTHER PUBLICATIONS

Notice of Second Review Observation dated Sep. 16, 2023 received in Chinese patent Application No. CN 202110338126.X.
International Search Report and Written Opinion dated Apr. 27, 2021 received in International Application No. PCT/CN2020/128859.
Notification to Grant Patent Right for Invention dated Feb. 23, 2024 received in Chinese patent Application No. CN 202110338126.X.
Notice of Reasons for Refusal dated Feb. 26, 2024 received in Japanese Patent Application No. JP 2023-500399.
Notice of Preliminary Rejection dated Feb. 25, 2025 for Korean Patent Application No. 10-2022-7038808.

* cited by examiner

BOX BODY, BATTERY, ELECTRIC APPARATUS AND MANUFACTURING METHOD OF THE BATTERY

CROSS-REFERENCE TO RELATED APPLICATIONS

This application is a continuation of International Application No. PCT/CN2020/128859, filed on Nov. 13, 2020, entitled "BOX BODY, BATTERY, ELECTRIC APPARATUS AND MANUFACTUIRNG METHOD OF THE BATTERY", the disclosure of which is hereby incorporated by reference in its entirety.

FIELD OF TECHNOLOGY

The present application relates to the field of energy storage devices, in particular to a box body, a battery, an electric apparatus and a manufacturing method of the battery.

BACKGROUND

Energy conservation and emission reduction plays a vital role in sustainable development of the automobile industry. Under the circumstances, electric vehicles due to the energy-saving and environment-friendly advantages have become an important part in sustainable development of the automobile industry. However, concerning the development of the electric vehicles, the battery technology is a key factor.

In the development of the battery technology, besides improvement on properties of a battery, safety is also an issue that should not be ignored. Therefore, how to enhance safety of the battery has been a technical problem that needs to be resolved urgently in the battery technology.

SUMMARY

The present application provides a box body, a battery, an electric apparatus and a manufacturing method of the battery, for the purpose of improving safety of the battery.

On the first aspect, the embodiments of the present application provide a box body used for a battery including a battery cell. The box body including: a plurality of walls, the plurality of walls enclosing to form an accommodating space for accommodating the battery cell, an interior of at least one wall being provided with a first flow channel, the first flow channel being configured to discharge emissions generated by thermal runaway of the battery cell out of the box body; and a cooling device, arranged in the first flow channel, the cooling device being configured to cool the emissions flowing through the cooling device, where the cooling device includes a cooling structure being configured to increase a contact area between the emissions and the cooling device.

In the above solution, the interior of the at least one wall in the box body is provided with the first flow channel, and the emissions generated by thermal runaway of the battery cell in the box body can be discharged out of the box body via the first flow channel. The first flow channel is provided with the cooling device, when the emissions flow through the cooling device in the first flow channel, the cooling device exchanges heat with the emissions so as to cool the emissions, thereby reducing the temperature of the emissions. The cooling device includes the cooling structure being configured to increase the contact area between the emissions and the cooling device. Due to the arrangement of the cooling structure, the contact area between the emissions and the cooling device is increased, so that the cooling device can take away more heat of the emissions, and the cooling capacity of the cooling device is improved. The cooling effect of the cooling device is better, the possibility of firing and burning of the emissions is reduced, and the safety of the battery is improved.

In some embodiments, the cooling structure includes a second flow channel for the emissions to pass through.

In the above solution, the cooling structure includes the second flow channel for the emissions to pass through. That is to say, by providing the second flow channel for the cooling device, the contact area between the cooling device and flue gas is increased, and the structure is simple. In the process that the emissions flow through the cooling device, the emissions can flow through in the second flow channel, contributing to cooling the emissions by the cooling device.

In some embodiments, an outer surface and/or an interior of the cooling device is provided with a second flow channel.

In the above solution, it is possible that the outer surface of the cooling device is provided with a second flow channel so as to bring convenience for molding of the second flow channel. It is also possible that the interior of the cooling device is provided with a second flow channel, so that in the process that the emissions flow through the cooling device, the emissions can directionally flow in the interior of the cooling device. It is also possible that both the outer surface and the interior of the cooling device are provided with a second flow channel respectively so as to make full use of the cooling device and increase the contact area between the cooling device and the emissions as far as possible.

In some embodiments, the cooling device includes a first end and a second end opposite to each other in an extending direction of the first flow channel, and the second flow channel runs through the first end and the second end.

In the above solution, the second flow channel runs through the first end and the second end opposite to each other of the cooling device in the extending direction. That is to say, in the process that the emissions flow through the cooling device, the emissions flow in from one end of the cooling device and flow out from the other end so as to prolong the time for the emissions to flow in the first flow channel, i.e., the contact time between the emissions and the cooling device is prolonged, the time for heat exchange between the emissions and the cooling device is longer, and the cooling capability of the cooling device is improved.

In some embodiments, the second flow channel extends in a shape of a straight line, a curved line or a fold line.

In the above solution, the second flow channel takes on a straight line, the second flow channel with such a shape is simple to mold, and the processing cost is low. The second flow channel may be in a shape of a curved line or a fold line, and the second flow channel with such a shape is helpful to expand the flowing path of the emissions in the second flow channel so as to further prolong the contact time between the emissions and the cooling device.

In some embodiments, the cooling structure includes a plurality of second flow channels independent from one another.

In the above solution, the cooling structure includes a plurality of second flow channels independent from one another. All of the second flow channels allow the emissions to pass through, so that the emissions can contact more wall surfaces of the second flow channels in the process of flowing through the cooling device, thus the cooling capability of the cooling device is improved.

In some embodiments, the cooling device includes a plurality of cooling pipes, and the interior of each cooling pipe is provided with the second flow channel.

In the above solution, the cooling device includes a plurality of cooling pipes, and the interior of each cooling pipe is provided with a second flow channel. That is to say, a plurality of cooling pipes internally provided with second flow channels can be used as the cooling devices to cool the emissions, and the whole structure is simple. Besides, gaps for the emissions to pass through may be formed among the cooling pipes, i.e., the emissions may not only contact the inner walls of the cooling pipes but also contact outer walls of the cooling pipes in the process of flowing through the cooling devices. Therefore, the cooling device with such a structure has a better cooling capability to the emissions.

In some embodiments, the cooling structure further includes a retention space, the retention space is communicated with the second flow channel, and the retention space is configured for retention of the emissions.

In the above solution, the retention space is used for retention of the emissions, when the emissions flow in the second flow channel, the emissions can flow into the retention space and momently stay in the retention time, and the time for heat exchange between the emissions and the cooling device is prolonged.

In some embodiments, the cooling structure includes a plurality of retention spaces distributed at intervals along an extending direction of the second flow channel.

In the above solution, the cooling structure includes a plurality of retention spaces distributed at intervals along an extending direction of the second flow channel, so that in the process that the emissions flow in the second flow channel, the emissions can enter into the plurality of retention spaces, a plurality of times of retention of the emissions in the plurality of retention spaces can be achieved, and the time for heat exchange between the emissions and the cooling device is further prolonged.

In some embodiments, the retention space is obliquely arranged from a position vertical to the extending direction of the second flow channel to a flowing direction of the emissions in the second flow channel.

In the above solution, oblique arrangement of the retention space makes the emissions easily flow into the retention space from the inside of the second flow channel, but difficultly flow into the second flow channel from the retention space, thereby prolonging the retention time of the emissions in the retention space.

In some embodiments, the cooling device includes a plurality of first cooling elements; the plurality of first cooling elements are arranged at intervals along the extending direction of the first flow channel; the plurality of first cooling elements are provided with first openings for the emissions to pass through; the first openings of the plurality of first cooling elements are communicated so as to form the second flow channels; and the retention space is formed between every two adjacent first cooling elements.

In the above solution, the cooling device includes a plurality of first cooling elements arranged at intervals along the extending direction of the first flow channel; the first openings of the plurality of first cooling elements are communicated so as to form the second flow channels; and a retention space is formed between every two adjacent first cooling elements. The cooling device with such a structure is simple in structure, and the molding difficulty of the first flow channel and the retention space is effectively reduced.

In some embodiments, the cooling device includes a plurality of second cooling elements; the plurality of second cooling elements are arranged at intervals along the extending direction of the first flow channel; the plurality of second cooling elements are provided with second openings for the emissions to pass through; projections of the second openings of every two adjacent second cooling elements are staggered with each other along the extending direction of the first flow channel; the second openings of the plurality of second cooling elements are communicated so as to form the second flow channels.

In the above solution, the projections of the second openings of every two adjacent second cooling elements are staggered with each other along the extending direction of the first flow channel, so that the second flow channel is distributed in a zigzag manner. After the emissions flow through the second opening of one second cooling element, the emissions change a flowing direction under the blocking effect of next second cooling element, the flowing path of the emissions is expanded, and the time for heat exchange between the emissions and the cooling device is prolonged.

In some embodiments, the box body further includes a fire control mechanism, arranged in the first flow channel, where the fire control mechanism is configured to release a fire control medium into the first flow channel when thermal runway of a battery cell takes place.

In the above solution, the fire control mechanism can release a fire control medium into the first flow channel when thermal runway of a battery cell takes place, and the fire control medium is mixed with the emissions so as to cool the emissions and lower concentration of the emissions to achieve flame retardance.

In some embodiments, in the flowing direction of the emissions inside the first flow channel, the fire control mechanism is arranged downstream or upstream of the cooling device; or, the fire control mechanism and the cooling device are stacked along a direction vertical to the flowing direction.

In the above solution, the fire control mechanism may be arranged downstream of the cooling device, and after the emissions generated by thermal runaway of the battery cell flow through and are cooled by the cooling device, the emissions are mixed with the fire control medium released by the fire control mechanism. The fire control mechanism is arranged upstream of the cooling device, and after the emissions generated by thermal runaway of the battery cell are mixed with the fire control medium released by the fire control mechanism, the emissions flow through and are cooled by the cooling device. The fire control mechanism and the cooling device may be stacked along a direction vertical to the flowing direction of the emissions in the first flow channel, so that the whole structure is more compact and space-saving.

In some embodiments, the box body further includes a detecting device, arranged in the first flow channel, where the detecting device is configured to detecte information parameters of the emissions inside the first flow channel.

The fire control mechanism is configured to release a fire control medium into the first flow channel when the information parameters reach preset values.

In the above solution, when the fire control mechanism detects that information parameters of the emissions in the first flow channel reach preset values, the fire control mechanism releases a fire control medium into the first flow channel so as to realize releasing of the fire control medium by the fire control mechanism.

In some embodiments, the box body further includes a mixing device, arranged in the first flow channel, where the mixing device is configured to enable the emissions and the fire control medium to be mixed prior to being discharged from the first flow channel.

In the above solution, the mixing device in the first flow channel can mix the emissions and the fire control medium prior to being discharged from the first flow channel, so that the emissions and the fire control medium can be sufficiently mixed, the risk of an over-high local concentration is reduced.

In some embodiments, the mixing device includes a barrier structure, where the barrier structure is configured to block the emissions and the fire control medium and changing a flowing direction so as to enable the emissions and the fire control medium to be mixed prior to being discharged from the first flow channel.

In the above solution, the emissions and the fire control medium are mixed by the barrier structure in the mixing device through blocking the emissions and the fire control medium and changing a flowing direction, so that the emissions and the fire control medium can be sufficiently mixed.

In some embodiment, the barrier structure includes a plurality of blocking elements distributed at intervals along the extending direction of the first flow channel, each blocking element is provided with a third opening thereon, and projections of every two adjacent third openings are staggered with each other along the extending direction of the first flow channel.

In the above solution, projections of the third openings of every two adjacent blocking elements are staggered with each other along the extending direction of the first flow channel. After flowing through the third opening of one blocking element, the emissions and the fire control medium change a flowing direction under the blocking effect of next blocking element, therefore, the emissions and the fire control medium can be sufficiently mixed under the blocking effect of the blocking element. The barrier structure making use of a plurality of blocking elements is simple, and an effect of mixing the emissions and the fire control medium is good. Besides, the blocking element with such a structure is helpful to expand the flowing path of the emissions and the fire control medium, and the cooling effect to the emissions is enhanced.

In some embodiments, a projection of the barrier structure in the extending direction of the first flow channel covers a projection of the first flow channel in the extending direction.

In the above solution, a projection of the barrier structure in the extending direction of the first flow channel covers a projection of the first flow channel in the extending direction. The barrier structure with such a structure has a good blocking effect for the emissions and the fire control medium, so that the emissions and the fire control medium can be sufficiently mixed.

In some embodiments, the barrier structure includes a helical blade, a central axis of the helical blade is coincident with or parallel to a central axis of the first flow channel.

In the above solution, when flowing through the helical blade, the emissions and the fire control medium flow in a form of a helical line under the effect of the helical blade, so that the emissions and the fire control medium can be sufficiently mixed under the effect of the helical blade.

In some embodiments, the barrier structure includes a plurality of helical blades, where the plurality of helical blades is arranged along the extending direction of the first flow channel, and every two adjacent helical blades are opposite in directions of turning.

In the above solution, every two adjacent helical blades in the barrier structure have opposite directions of turning, so that in the process that the emissions and the fire control medium flow through the barrier structure, the emissions and the fire control medium flow in a form of helical lines with different directions of turning under the effect of the helical blades with different directions of turning, and the emissions and the fire control medium can be sufficiently mixed by the barrier structure.

In some embodiments, the interior of at least one wall is provided with a plurality of first flow channels with a same extending direction; every two adjacent first flow channels of the plurality of first flow channels are independent from each other; or, at least two first flow channels of the plurality of first flow channels are communicated.

In the above solution, on the condition that the interior of a wall of the box body is provided with a plurality of first flow channels with a same extending direction, every two adjacent first flow channels are independent from each other, or at least two first flow channels are communicated. If every two adjacent first flow channels are independent from each other, the emissions are free of mutual interference in the flowing process of respective first flow channel. If at least two first flow channels are communicated, the emission having entered into one first flow channel can enter into the other first flow channel communicated with the first flow channel.

In some embodiments, at least two first flow channels of the plurality of first flow channels are communicated, and the emissions successively flow through the cooling devices of the at least two first flow channels and then are discharged out of the box body.

In the above solution, on the condition that at least two first flow channels are communicated, the emissions successively flow through the cooling devices of the at least two first flow channels and then are discharged out of the box body. In the process of discharging the emissions out of the box body from the inside of the box body, the emissions can be cooled by a plurality of cooling devices in different first flow channels, so that the cooling effect to the emissions is good.

In some embodiments, the first flow channel includes an inlet; the inlet is provided with a separator; the separator is configured to open the inlet when thermal runaway of a battery cell takes place so as to enable the emissions to smoothly enter into the first flow channel via the inlet.

In the above solution, the inlet of the first flow channel is provided with a separator. Under normal circumstances (thermal runway of a battery cell does not take place), the separator can prevent particles in the accommodating space of the box body from entering the first flow channel and thus reduce the risk that the inlet of the first flow channel is blocked by the particles. When thermal runaway of a battery cell takes place, the separator opens the inlet of the first flow channel, so that the emissions generated by thermal runaway of the battery cell can enter into the first flow channel via the inlet.

In some embodiments, the separator is configured to be broken when thermal runaway of a battery cell takes place so as to open the inlet.

In some embodiments, the box body further includes a pressure relief mechanism. The first flow channel includes an outlet. The pressure relief mechanism is arranged on the outlet and configured to open the outlet when thermal runaway of a battery cell takes place so as to enable the emissions in the first flow channel to be discharged out of the box body via the outlet.

In the above solution, the outlet of the first flow channel is provided with a pressure relief mechanism, which plays a role of pressure balance under normal circumstances. When thermal runway of a battery cell takes place, the pressure relief mechanism opens the outlet of the first flow channel so as to enable the emissions to be smoothly discharged out of the box body.

On the second aspect, the embodiments of the present application provide a battery, comprising: a battery cell, and a box body of the first aspect or any of embodiments of the first aspect, and the battery cell is accommodated within the accommodating space.

In the above solution, as the cooling device in the box body of the battery includes a cooling structure capable of increasing the contact area between the emissions and the cooling device, the cooling device has a good cooling effect, the possibility of firing and burning of emissions is reduced, and the safety of the battery is improved.

On the third aspect, the present application embodiment provides an electric apparatus, comprising the battery provided by the second aspect.

On the fourth aspect, the embodiments of the present application further provide a manufacturing method of a battery, comprising: providing a battery cell; providing a box body, where the box body includes: a plurality of walls, the plurality of walls enclosing to form an accommodating space for accommodating the battery cell, an interior of at least one wall being provided with a first flow channel, the first flow channel being configured to discharge emissions generated by thermal runaway of the battery cell out of the box body; and; and a cooling device, arranged in the first flow channel, the cooling device being configured to cool the emissions flowing through the cooling device, where the cooling device includes a cooling structure being configured to increase the contact area of the emissions and the cooling device; the battery cell is accommodated in the accommodating space.

BRIEF DESCRIPTION OF THE DRAWINGS

To clearly explain the technical solutions in the embodiments of the present application, a brief introduction about drawings used in the embodiments of the present application will be given below. Apparently, the drawings described below are merely a part of those used in the embodiments of the present application, and those of ordinary skill in the art would obtain other drawings based on the drawings below without paying any creative effort.

Figure 1:
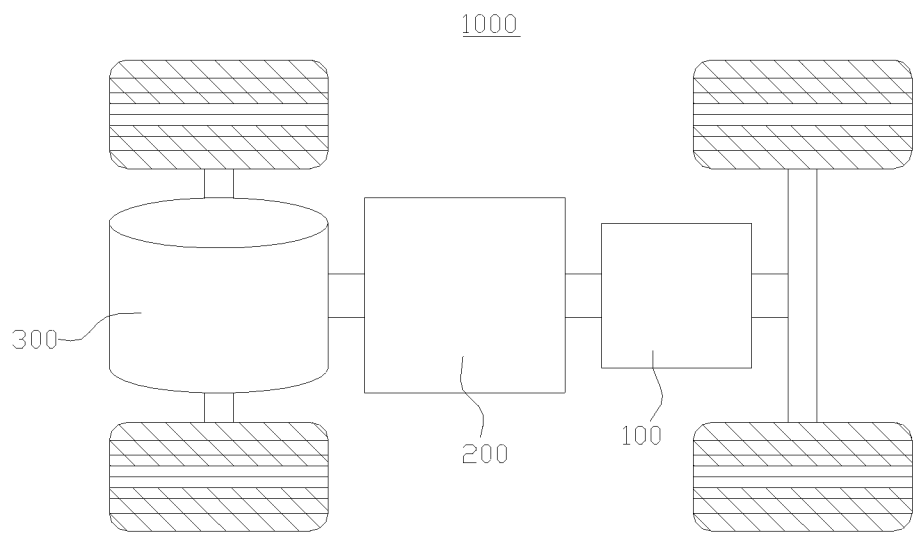
FIG. 1 is a schematically structural diagram of a vehicle provided by some embodiments of the present application.

In the drawings, the figures are not necessarily drawn to scale.

The reference numerals denote that: 10 box body; 11 cooling device; 111 cooling structure; 112 groove; 113 second flow channel; 1131 inlet end; 1132 outlet end; 114 first end; 115 second end; 116 cooling pipe; 117 retention space; 118 first cooling element; 118a first connector; 1181 first opening; 1182 first cooling plate; 1183 second cooling plate; 119 second cooling element; 119a second connector; 1191 second opening; 12 wall; 13 accommodating space; 14 first flow channel; 141 inlet; 142 outlet; 143 blocking part; 144 connecting hole; 15 first portion; 16 second portion; 17 separator; 18 pressure relief mechanism; 19 fire control mechanism; 191 housing; 1911 accommodating cavity; 1912 third flow channel; 192 triggering device; 20 detecting device; 21 control system; 22 mixing device; 221 barrier structure; 2211 helical blade; 2212 blocking element; 2213 third opening; 2214 third connector; 30 battery cell; 100 battery; 200 controller; 300 motor; 1000 vehicle; X flowing direction.

DETAILED DESCRIPTION OF THE EMBODIMENTS

In order to make the purposes, technical solutions and advantages of the present application more clear, the technical solutions in the embodiments of the present application will be clearly described in the following embodiments by referring to the appended drawings. It is apparent that, the described embodiments are only a portion of, not all embodiments of the present application. Based on the embodiments of the present application, all other embodiments obtained by an ordinary skilled person in the art without paying any creative effort may fall into the protection scope of the present application.

Unless otherwise defined, all technical and scientific terms used in the present application have the same meanings as those commonly understood by those skilled in the art. The terms used in the specification of the present application merely intend to describe specific embodiments rather than to restrict the present application; The terms "comprise" and "have" and any variations thereof in the specification, claims and the above-mentioned appended drawings are intended to cover non-exclusive inclusion. The terms "first", "second" and the like in the specification, claims, and the above appended drawings of the present application are used to distinguish different objects and are not used to describe a particular order or a primary-secondary relationship.

The term "embodiment" mentioned in the present application means that, the specific features, structures or properties described in combination with the embodiments can be incorporated in at least one embodiment of the present application. The term "embodiment" occurring in different parts of the description refers to neither a same embodiment all the time nor an independent or alternative embodiment conflicting with other embodiments. It should be understood by those skilled in the art explicitly and explicitly that, the embodiments described in the present application may be combined with other embodiments.

In the present application, it should be noted that, unless otherwise stipulated, the terms "mount", "link", "connect", "attach" and the like should be understood in a broad sense, e.g., fixed connection, detachable connection or integral connection; or direct connection, or indirect connection via a medium, inside communication of two elements. For those of ordinary skill in the art, its particular meanings can be understood depending on the particular contexts.

The term "and/or" in the present application merely describes an association relationship between associated objects, representing three existence relationships, e.g., A and/or B may denote that there is only A, there are A and B at the same time, and there is only B. Besides, the character "/" in the present application generally represents that the associated objects are in an "or" relationship.

In the present application embodiments, the same reference signs represent same components. For the sake of brevity, detailed descriptions of the same components are omitted in different embodiments. It should be understood that, dimensions such as a thickness, a length and a width of each component, and dimensions such as an overall thickness, a length and a width of an integrated device as shown in the appended drawings are for illustrative purposes only and shall not constitute any limitation to the present application.

The term "a plurality of" in the present application means at least two (including two).

In the present application, the battery cell may include a lithium ion secondary battery, a lithium ion primary battery, a lithium-sulfur battery, a sodium lithium-ion battery, a sodium ion battery or magnesium ion battery or the like, which is not limited in the embodiments of the present application. The battery cell may be in a form of a cylinder, a flat body, a cuboid, or any of other shapes, which is not limited in the embodiments of the present application embodiment. The battery cell is generally divided into three types according to the way of packaging: cylindrical battery cells, square battery cells and flexible package battery cells, which is not limited by the embodiments of the present application.

The battery mentioned in the embodiments of the present application means a single physical module comprising one or a plurality of battery cells to provide a higher voltage and capacity. For example, the battery mentioned in the present application may include a battery module or a battery pack, etc. A battery generally includes a box body for encapsulating one or a plurality of battery cells. The box body can prevent charging or discharging of the battery cell from being affected by liquid or other foreign matters.

The battery cell includes an electrode assembly and an electrolyte. The electrode assembly consists of a positive plate, a negative plate and a separator. The battery cell works mainly depending on movement of metal ions between the positive and negative plates. The positive plate includes a positive current collector and a positive active material layer. The positive active material layer is coated on the surface of the positive current collector, the current collector, uncoated with a positive active material layer protrudes from the current collector coated with a positive active material layer. The current collector, uncoated with a positive active material layer is used as a positive electrode lug. By taking a lithium-ion battery as an example, the positive current collector may be made of aluminum, and the positive active material can be lithium cobaltate, lithium iron phosphate, lithium ternary or lithium manganate, etc. The negative plate includes a negative current collector and a negative active material layer. The negative active material layer is coated on the surface of the negative current collector. The current collector uncoated with the negative active material layer protrudes from the current collector coated with the negative active material layer. The current collector uncoated with the negative active material layer is used as a negative electrode lug. The negative current collector may be made of copper, and the negative active material can be carbon, silicon or the like. In order to ensure passing of a high current without fusing, a plurality of positive electrode lugs are provided and stacked together, and the plurality of negative electrode lugs are provided and stacked together. The separator may be made of PP (polypropylene), PE (polyethylene, polyethylene) or the like. In addition, the electrode assembly may be either wound-type or laminated-type, which is not limited by the embodiments of the present application. Many design factors should be considered in the development of the battery technology, such as energy density, cycle life, discharge capacity, charge-discharge ratio and so on, and besides, safety of the battery also needs to be taken into account.

In the use process of the battery, in the battery cell of the battery, a large amount of gas is generated in a short period of time, and a temperature rises quickly, therefore, an anti-explosion valve on the battery cell is opened, a great deal of emissions are discharged into the box body of the battery, so that a great deal of gas gathers in the box body, the temperature therein rises, and finally a phenomenon that the battery explodes or fires, which is called thermal runaway of the battery, may be caused.

The emissions of the battery cell mentioned in the present application include but limited to: electrolytes, dissolved or split positive and negative electrode plates, fragments of a separator, high temperature and high pressure gases produced by reactions (such as H2, CO and other combustible gases), flame, etc.

The inventor finds that, in the battery, the emissions generated by thermal runaway of the battery cell are high in temperature and concentration. If the emissions are directly discharged to air, the emissions contact oxygen-enriched air, it is easy to fire to cause explosion, so potential safety hazards exist.

In view of the above, the embodiments of the present application provide a technical solution in which an interior of at least one wall of a box body is provided with a first flow channel, a cooling device is arranged in the first flow channel. The cooling device includes a cooling structure used for increasing a contact area between the emissions generated by thermal runaway of a battery cell and the cooling device, so that the cooling capability of the cooling device is improved, and the possibility of firing and burning of the emissions is reduced, thus the safety of the battery is improved.

The technical solutions described in the embodiments of the present application are applicable to all types of electric apparatuses using batteries. The electric apparatuses can be vehicles, mobile phones, portable devices, laptops, ships, spacecraft, electric toys, electric tools and so on. The vehicles may refer to an oil-fueled vehicle, a gas vehicle or a new energy vehicle. The new energy vehicle may be a pure electric vehicle, a hybrid vehicle or an extended-range vehicle, etc. A spacecraft may include an aircraft, a rocket, a space shuttle, a spaceship, and so on; Electric toys include fixed or mobile electric toys, for example, game machines, electric car toys, electric ship toys, electric aircraft toys, etc. Electric tools include electric metal cutting tools, electric grinding tools, electric assembling tools, and electric tools for railways, for example, electric drills, electric grinding wheel machines, electric wrenches, electric screwdrivers, electric hammers, impact electric drills, concrete vibrators, electric planers, etc. The embodiments of the present application do not make special restrictions on the above-mentioned electric apparatuses.

FIGS. 1 to 31 illustratively show a box body, a battery, an electric apparatus and a manufacturing method of the battery of the present application.

For the purpose of easy explanations of the following embodiments, the vehicle 1000 as the electric apparatus will be taken as an example for description.

Please refer to FIG. 1, it shows a schematically structural diagram of the vehicle 1000 provided by some embodiments of the present application. The interior of the vehicle 1000 is provided with a battery 100. The battery 100 can be disposed at the bottom, head or tail of the vehicle 1000. The battery 100 supplies power to the vehicle 1000, for example, the battery 100 can serve as an operational power supply of the vehicle 1000.

The vehicle 1000 further includes a controller 200 and a motor 300. The controller 200 is used for controlling the battery 100 to supply power for the motor 300 to meet requirements on work electricity for example in start, navigation or driving of the vehicle 1000.

In some embodiments of the present application, the battery 100 can serve as not only an operational power supply of the vehicle 1000, but also a drive power supply of the vehicle 1000, thereby substituting or partially substituting fuel oil or natural gas to supply power for the vehicle 1000.

According to different requirements, there may be one or a plurality of battery cells 30 in the battery 100. If there are a plurality of battery cells 30, the plurality of battery cells 30 are in series, parallel or parallel-series connection. The parallel-series connection means the plurality of battery cells 30 adopt both serial connection and parallel connection. In the battery 100, the plurality of battery cells 30 are in directly series, parallel or parallel-series connection. Or, the plurality of battery cells 30 are firstly in series, parallel or parallel-series connection to form a plurality of battery modules, and then the plurality of battery modules are in series, parallel or parallel-series connection to form a whole. That is to say, the plurality of battery cells 30 can be directly used to form the battery 100, or the plurality of battery cells 30 firstly form battery modules and then the battery modules form the battery 100.

Figure 2:
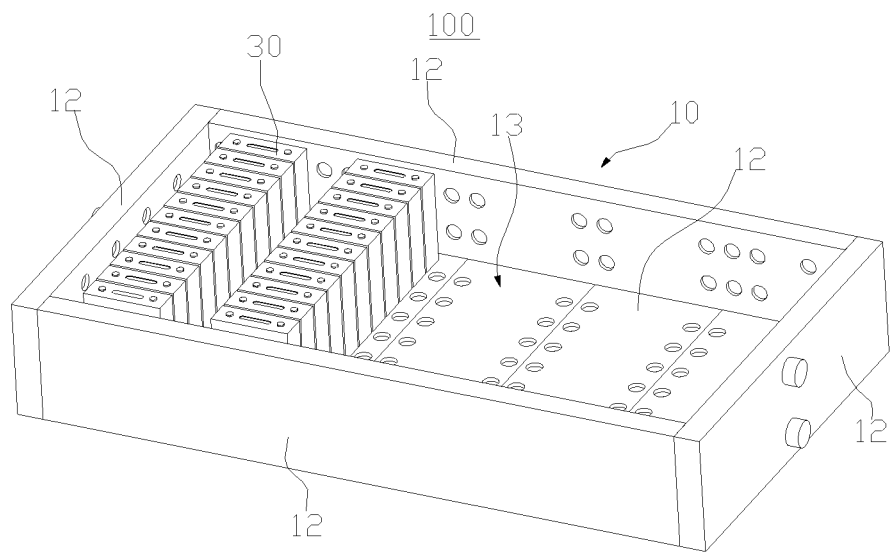
FIG. 2 is a schematically structural diagram of a battery provided by some embodiments of the present application.

Please refer to FIG. 2, it shows a schematically structural diagram of the battery 100 provided by some embodiments of the present application. The battery 100 includes a box body 10 and a battery cell 30. The battery cell 30 is accommodated in the box body 10.

If there are a plurality of battery cells 30 in the battery 100, the plurality of battery cells 30 are arranged in the box body 10 in a matrix manner For example, as shown in FIG. 2, the plurality of battery cells 30 are arranged in the box body 10 in a form of a 4*11 rectangular array. That is to say, the plurality of battery cells 30 in the battery 100 are divided into 4 columns (FIG. 2 shows 2 columns), and each column has 11 battery cells 30. Each column of battery cells 30 may be in series, parallel or parallel-series connection to form battery modules, and the battery modules are in series, parallel or parallel-series connection and then accommodated in the box body 10.

Of course, the battery 100 further includes other components. For example, the battery 100 further includes influx components (not shown). By means of the influx components, the plurality of battery cells 30 are electrically connected to achieve series, parallel or parallel-series connection of the plurality of battery cells 30. For another example, the battery 100 further includes a thermal management component (not shown) for accommodating a fluid to adjust a temperature of the battery cell 30. The fluid accommodated by the thermal management component may be liquid or gas, e.g., water, a mixed solution of water and glycol or air. Adjustment on the temperature of the battery cell 30 by the thermal management component may refer to heating or cooling the battery cell 30. When cooling the battery cell 30, the thermal management component may be called as a cooling component, a cooling system, a cooling plate, etc.

The box body 10 is used for accommodating the battery cell 30. The box body 10 is varied in structure. The structure of the box body 10 will be described in detail by referring to the appended drawing.

Figure 3:
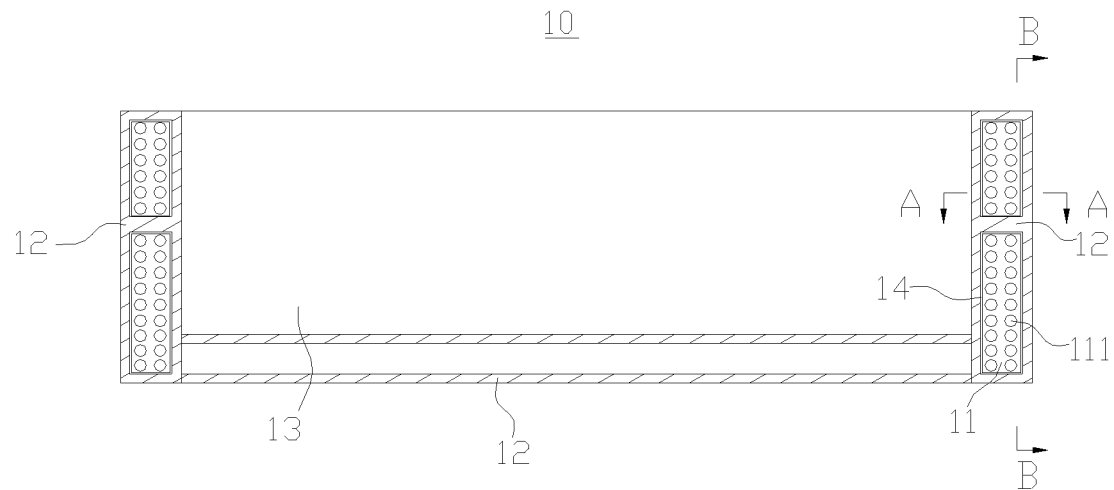
FIG. 3 is a schematically structural diagram of a box body provided by some embodiments of the present application.

Please refer to FIG. 3, it shows a schematically structural diagram of the box body 10 provided by some embodiments of the present application. The box body 10 includes a cooling device 11 and a plurality of walls 12. The plurality of walls 12 enclose to form an accommodating space 13 for accommodating a battery cell 30, an interior of at least one wall 12 is provided with a first flow channel 14, and the first flow channel 14 is used for discharging emissions generated by thermal runaway of the battery cell 30 out of the box body 10. The cooling device 11 is arranged in the first flow channel 14 and used for cooling the emissions flowing through the cooling device 11. The cooling device 11 includes a cooling structure 111 used for increasing the contact area between the emissions and the cooling device 11.

In the above structure, the interior of at least one wall 12 in the box body 10 is provided with a first flow channel 14, and the emissions generated by thermal runaway of the battery cell 30 in the box body 10 can be discharged out of the box body 10 via the first flow channel 14. The first flow channel 14 is internally provided with a cooling device 11. When the emissions flow through the cooling device 11 in the first flow channel 14, the cooling device 11 can exchange heat with the emissions to cool the emissions so as to reduce the temperature of the emissions. The cooling device 11 includes a cooling structure 111 used for increasing the contact area between the emissions and the cooling device 11, so the cooling device 11 can take away more heat of the emissions, and the cooling capacity of the cooling device 11 is improved. The cooling effect of the cooling device 11 is better, the possibility of firing and burning of emissions is reduced, and the safety of the battery 100 is improved.

It should be noted that, the cooling structure 111 in the cooling device 11 is capable of increasing the contact area between the cooling device 11 and the emissions. It is understandable that, when the emissions flow in the first flow channel 14, the contact area between the emissions and the cooling device 11 without the cooling structure 111 is less than that between the emissions and the cooling device 11 with the cooling structure 111.

Illustratively, the cooling structure 111 in the cooling device 11 is used for increasing the contact area between the emissions and the box body 10. For example, in the case where the first flow channel 14 does not have the cooling device 11 therein, the contact area between the emissions and the box body 10 is A1 when the emissions flow out of the box body 10 via the first flow channel 14; and in the case where the first flow channel 14 has a cooling device 11 with a cooling structure 111 therein, the contact area between the emissions and the box body 10 is A2 when the emissions flow out of the box body 10 via the first flow channel 14, where A1 is less than A2.

The box body 10 may be in a shape of a hollow cuboid, cylinder or the like. The cross section of the first flow channel 14 may be in a shape of a circle, oval, rectangle or the like. The cross section mentioned above refers to a section of the first flow channel 14 in the extending direction.

It should be noted that, in an arbitrary one wall 12 of the box body 10, a first flow channel 14 or a plurality of first flow channels 14 may be formed. Each of the first flow channels 14 can be provided with a cooling device 11. In the case where one wall 12 is internally provided with a plurality of first flow channels 14, the plurality of first flow channels 14 in the wall 12 are independent from each other or intercommunicated. In the case where a plurality of walls 12 in the box body 10 are provided with the first flow channels 14, the first flow channels 14 among walls 12 are independent from each other or intercommunicated. One first flow channel 14 and another first flow channel 14 are independent from each other, i.e., they are not intercommunicated.

Illustratively, in the molding process of the box body 10, each wall 12 is molded and processed, so that a first flow channel 14 is formed in the wall 12, and then all walls 12 are assembled to form the box body 10.

It should be noted that, in the embodiments of the present application, the arrangement direction of the first flow channel 14 in the wall 12 of the box body 10 can be set in accordance with the specific shape of the box body 10. For example, if the box body 10 is cylinder-shaped, the first flow channel 14 can extend along the peripheral direction of the box body 10, or extend along the axial direction of the box body 10. For another example, if the box body 10 is cuboid-shaped, the first flow channel 14 on the side wall of the box body 10 can extend along the length direction of the side wall of the box body 10, or extend along the height direction of the wall 12 of the box body 10.

In some embodiments, please continue to refer to FIG. 3, the accommodating space 13 for accommodating the battery cell 30 in the box body 10 is open at one end. The battery cell 30 can be placed in the battery cell 30 via the open end of the box body 10. By taking a box body 10 that is a cuboid as an example, the box body 10 has one bottom wall and four side walls, that is, the box body 10 has five walls 12, and the bottom wall and/or side walls of the box body 10 may be provided with first flow channels 14. After the battery cell 30 is placed in the box body 10, the opening of the box body 10 can be plugged, e.g., the opening of the box body 10 is plugged by a box cover (not shown) so as to provide a sealing environment for the battery cell 30.

Figure 4:
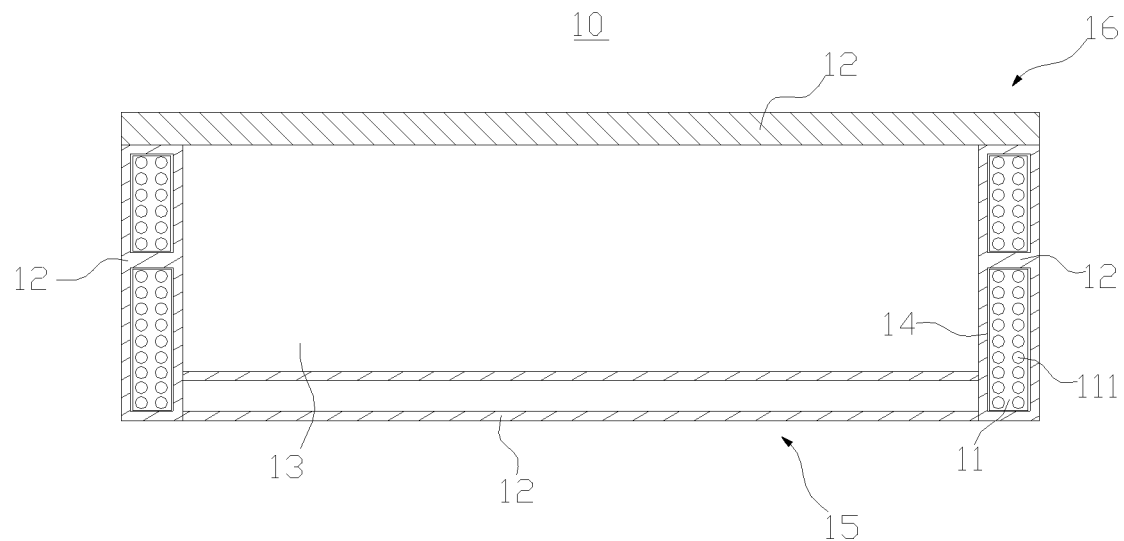
FIG. 4 is a schematically structural diagram of the box body provided by further some embodiments of the present application.

In some embodiments, please refer to FIG. 4, it shows a schematically structure diagram of the box body 10 provided by further some embodiments of the present application. The accommodating space 13 for accommodating the battery cell 30 in the box body 10 may be a closed sealing space. The box body 10 may include a first portion 15 and a second portion 16. The first portion 15 is of a hollow structure with one open end. The second portion 16 covers the open end of the first portion 15. The second portion 16 and the first portion 15 jointly define a sealing space for accommodating the battery 100. The first portion 15 and the second portion 16 may constitute a cuboid, a cylinder or the like. By taking a box body 10 that is a cuboid formed by the first portion 15 and the second portion 16 as an example, the box body 10 has a bottom wall, four side walls and a top wall, i.e., the box body 10 has six walls 12, the first portion 15 is of a hollow structure formed by one bottom wall and four side walls and having an open end. The second portion 16 is a top wall and covers the open end of the first portion 15 to form the box body 10. The at least one wall 12 of the box body 10 is internally provided with a first flow channel 14.

Figure 5:
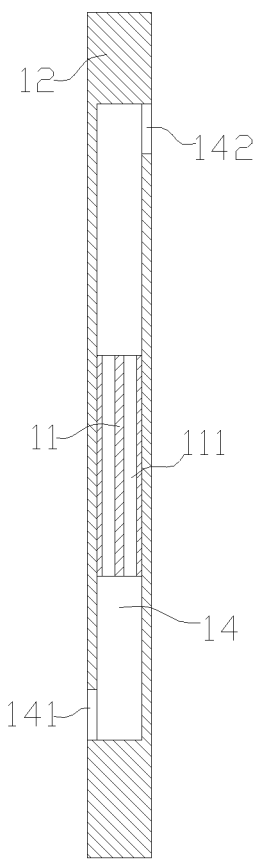
FIG. 5 is an A-A cutaway view of the box body provided by some embodiments as shown in FIG. 3.

In the embodiments of the present application, please refer to FIG. 5, it shows an A-A cutaway view of the box body 10 provided by some embodiments as shown in FIG. 3. The first flow channel 14 includes an inlet 141 and an outlet 142. The emissions generated by thermal runaway of the battery cell 30 can enter into the first flow channel 14 via the inlet 141, and the emissions in the first flow channel 14 can be discharged out of the box body 10 via the outlet 142. The inlet 141 is formed in the inner surface of the wall 12 of the box body 10, and the outlet 142 is formed in the outer surface of the wall 12 of the box body 10.

In the box body 10, each first flow channel 14 may be separately provided with an inlet 141 and an outlet 142, or a plurality of first flow channels 14 share an inlet 141 and an outlet 142. Of course, in the box body 10, it is possible that a portion of the first flow channels 14 share an inlet 141 and an outlet 142, for example, if the box body 10 is a cuboid, the box body 10 has six walls 12, each first flow channel 14 of each wall 12 shares an inlet 141 and an outlet 142, in such a case, the whole box body 10 has six inlets 141 and six outlets 142. In the box body 10, it is also possible that all first flow channels 14 share an inlet 141 and an outlet 142, in such a case, the whole box body 10 has one inlet 141 and one outlet 142. In a non-limited embodiment, the bottom wall and the side walls of the box body 10 are internally provided with a first flow channel 14 respectively, each first flow channel 14 is separately provided with an inlet 141 and an outlet 142. In another non-limited embodiment, the bottom wall, the side walls and the top wall of the box body 10 are internally provided with a first flow channel 14 respectively, and each first flow channel 14 is separately provided with an inlet 141 and an outlet 142.

In the embodiments of the present application, the emissions generated by thermal runaway of the battery cell 30 can be discharged out of the box body 10 via the first flow channel 14. Under normal circumstance (thermal runaway of the battery cell 30 does not take place), particles in the accommodating space 13 of the box body 10 may block the inlet 141 of the first flow channel 14, so that the emissions generated by thermal runaway of the battery cell 30 cannot be discharged out.

Figure 6:
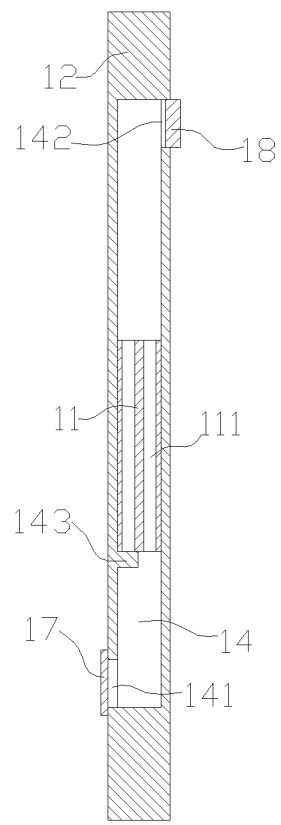
FIG. 6 is an A-A cutaway view of the box body provided by further some embodiments as shown in FIG. 3.

Therefore, in some embodiments, please refer to FIG. 6, it shows an A-A cutaway view of the box body 10 provided by further some embodiments as shown in FIG. 3. The inlet 141 of the first flow channel 14 is provided with a separator 17. When thermal runaway of the battery cell 30 takes place, the separator 17 is configured to open the inlet 141, so that the emissions can enter into the first flow channel 14 via the inlet 141.

Under normal circumstances (thermal runway of the battery cell 30 does not take place), the separator 17 can prevent particles in the accommodating space 13 of the box body 10 from entering the first flow channel 14 and thus reduce the risk that the inlet 141 of the first flow channel 14 is blocked by the particles. When thermal runaway of the battery cell 30 takes place, the separator 17 opens the inlet 141 of the first flow channel 14 so that the emissions generated by thermal runway of the battery cell 30 can enter into the first flow channel 14 via the inlet 141.

In some embodiments, the separator 17 is configured to be broken when thermal runaway of the battery cell 30 takes place so as to open the inlet 141, that is to say, the separator 17 opens the inlet 141 of the first flow channel 14 in a damaged manner The separator 17 may be broken due to pressure rise in the box body 10 or broken due to melting as a result of temperature rise in the box body 10. Illustratively, the separator 17 may be a film arranged on the inlet 141 of the first flow channel 14.

The separator 17 may be in other structures. For example, the separator 17 may be a switching valve arranged at the inlet 141 of the first flow channel 14. When the pressure or temperature reaches a preset value in the box body 10, the switching valve opens the inlet 141 of the first flow channel 14, so that the emissions can smoothly enter into the first flow channel 14 via the inlet 141.

In some embodiments, it is also possible that a filter net (not shown) is additionally arranged on the inlet 141 of the first flow channel 14 so as to filter particles in the box body 10.

It should be noted that, the inlet 141 of the first flow channel 14 can be provided with a filter net and a separator 17 at the same time. The inlet 141 of the first flow channel 14 may be merely provided with a separator 17 (as shown in FIG. 6). The inlet 141 of the first flow channel 14 may be merely provided with a filter net.

In the embodiments of the present application, the cooling device 11 is fixed in the first flow channel 14. For example, the cooling device 11 is fixed in the first flow channel 14 via a connector or by sticking. In some embodiments, the connector may be a bolt, a screw or the like. The cooling device 11 may be directly put in the first flow channel 14.

In some embodiments, a wall surface of the first flow channel 14 is provided with a blocking part 143, the blocking part 143 is arranged between the cooling device 11 and the inlet 141 of the first flow channel 14, and the blocking part 143 can block the cooling device 11 to reduce the risk that the emissions cannot be discharged out of the box body 10 via the first flow channel 14 as the cooling device 11 displaces in the first flow channel 14 to block the inlet 141.

In the case where the inlet 141 of the first flow channel 14 is provided with a filter net and/or a separator 17, as shown in FIG. 6, a wall surface of the first flow channel 14 is provided with a blocking part 143, the blocking part 143 is arranged between the cooling device 11 and the inlet 141 of the first flow channel 14, and the blocking part 143 can block the cooling device 11 to reduce the risk that the filter net and/or separator 17 are/is damaged as the cooling device 11 displaces in the first flow channel 14 to collide with the filter net and/or separator 17.

Besides, in some embodiments, please continue to refer to FIG. 6, the box body 10 further includes a pressure relief mechanism 18. The pressure relief mechanism 18 is arranged at the outlet 142 of the first flow channel 14 and used for opening the outlet 142 when thermal runaway of the battery cell 30 takes place, so that the emissions in the first flow channel 14 can be discharged out of the box body 10 via the outlet 142.

Under normal circumstances, the pressure relief mechanism 18 plays a role in pressure balance. The pressure relief mechanism 18 is capable of opening the outlet 142 of the first flow channel 14 when the inside pressure or temperature in the box body 10 reaches a reset value as a result of thermal runaway of the battery cell 30, so that the emissions can be smoothly discharged out of the box body 10. The pressure relief mechanism 18 may be an anti-explosion valve, an air valve, a pressure relief value or a safety valve.

Figure 7:
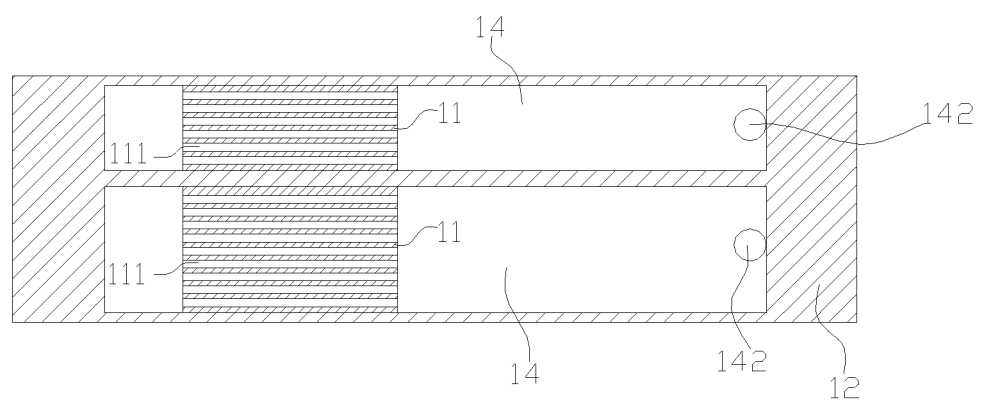
FIG. 7 is a B-B cutaway view of the box body provided by some embodiments as shown in FIG. 3.
Figure 8:
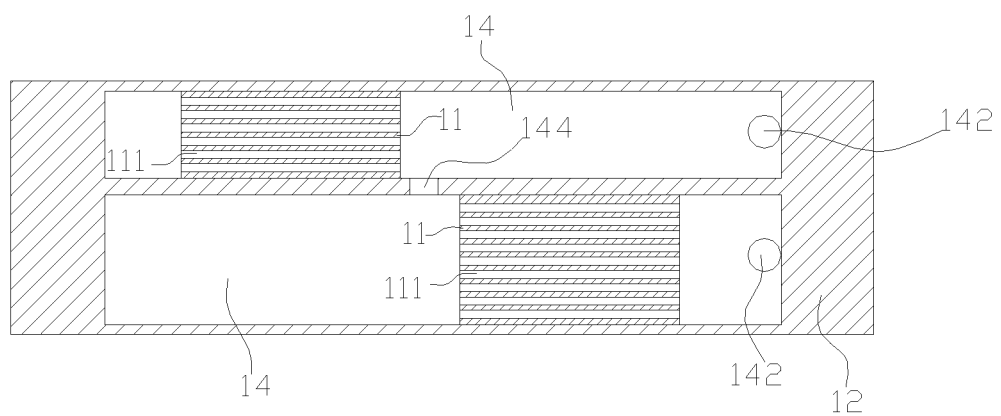
FIG. 8 is a B-B cutaway view of the box body provided by further some embodiments as shown in FIG. 3.

In some embodiments, please refer to FIGS. 7 to 8, FIG. 7 shows a B-B cutaway view of the box body 10 provided by some embodiments as shown in FIG. 3, and FIG. 8 shows a B-B cutaway view of the box body 10 provided by further some embodiments as shown in FIG. 3. In the box body 10, the interior of at least one wall 12 is provided with a plurality of first flow channels 14 with a same extending direction. That is to say, in the box body 10, it is possible that the interior of one wall 12 is provided with a plurality of first flow channels 14 with a same extending direction, and it is also possible that the interiors of a plurality of walls 12 are provided with a plurality of first flow channels 14 with a same extending direction. Understandably, each first flow channel 14 is internally provided with a cooling device 11.

As shown in FIG. 7, in arbitrary one wall 12 of the box body 10, every two first flow channels 14 of the plurality of first flow channels 14 are independent from each other, i.e., arbitrary two first flow channels 14 are not intercommunicated, after the emissions in the accommodating space 13 enters the first flow channel 14 via one inlet 141 (not shown in FIG. 7) of the first flow channel 14, flow through the cooling device 11 and then are discharged out of the box body 10 via the outlet 142 of the first flow channel 14. The flowing processes of the emissions in the plurality of first flow channels 14 are free of mutual interference.

As shown in FIG. 8, at least two first flow channels 14 of the plurality of first flow channels 14 in arbitrary one wall 12 of the box body 10 are communicated to each other. The emissions entering one first flow channel 14 may enter the other flow channel communicated with the first flow channel 14. In some embodiments, the emissions can successively flow through the cooling devices 11 of at least two first flow channels 14 and then are discharged out of the box body 10. That is to say, in the process that the emissions are discharged out of the box body 10 from the inside of the box body 10, the emissions flow in a Z shape and can be successively cooled by the plurality of cooling devices 11 in different first flow channels 14, and the cooling effect to the emissions is good.

Illustratively, as shown in FIG. 8, by taking the box body 10 which is a cuboid and of which one side wall is provided with two intercommunicated first flow channels 14 as an example, two cooling devices 11 in the two first flow channels 14 are staggered in the extending direction of the first flow channel 14, the two first flow channels 14 are communicated via a connecting hole 144, and the connecting hole 144 is formed between the two cooling devices 11 in the extending direction of the first flow channel 14. In FIG. 8, the extending direction of the first flow channel 14 is consistent with the length direction of the side wall.

In the embodiments of the present application, the cooling device 11 plays a role in cooling the emissions in the first flow channel 14. The cooling device 11 is varied in structure, and the cooling structure 111 of the cooling device 11 is also varied in structure. The specific structures of the cooling device 11 and the cooling structure 111 will be explained in detail below in conjunction with the appended drawings.

In the embodiments of the present application, the cooling device 11 is made of a material with a good heat exchange property, for example, metal, ceramic or the like. The metal is selected from a group consisting of copper, iron, aluminium, aluminium alloys, stainless steel and the like.

Figure 9:
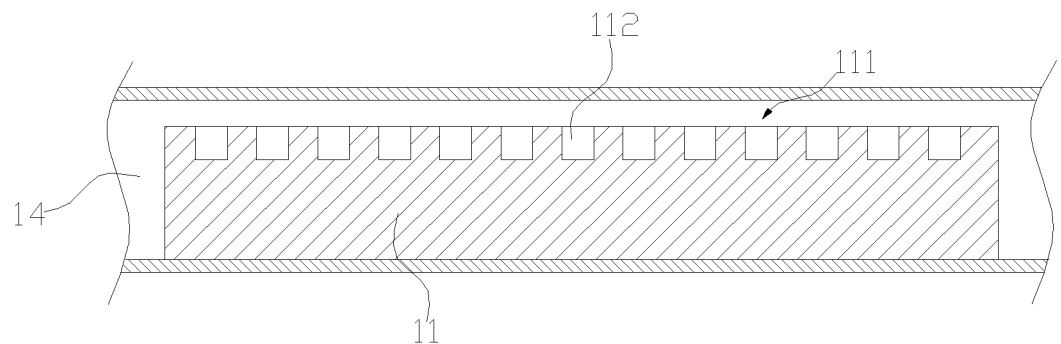
FIG. 9 is a schematically structural diagram of a cooling device provided by some embodiments of the present application disposed in a first flow channel.

In some embodiments, please refer to FIG. 9, it shows a schematically structural diagram of the cooling device 11 provided by some embodiments of the present application disposed in the first flow channel 14. The cooling structure 111 includes a groove 112 formed on a peripheral wall of the cooling device 11. A gap exists between at least a portion of the peripheral wall of the cooling device 11 and the wall surface of the first flow channel 14 for the emissions to pass through. When flowing through the cooling device 11, the emissions can enter into the groove 112 and contact the groove wall 12 of the groove 112. Arrangement of the groove 112 on the cooling device 11 contributes to increasing a contact area between the emissions and the cooling device 11, and the cooling capability of the cooling device 11 is improved.

Understandably, please refer to FIG. 9, the peripheral wall of the cooling device 11 is provided with a plurality of grooves 112 so as to increase the contact area between the emissions and the cooling device 11, and the cooling capability of the cooling device 11 is improved.

Illustratively, in FIG. 9, the cooling device is a rod-like component distributed along the extending direction of the first flow channel.

Figure 10:
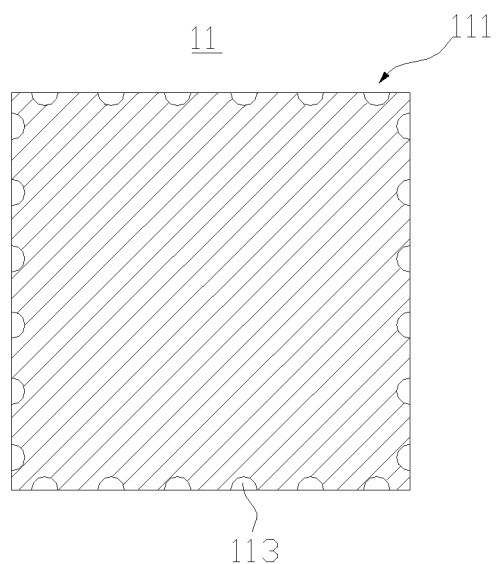
FIG. 10 is a sectional view of the cooling device provided by some embodiments of the present application.
Figure 11:
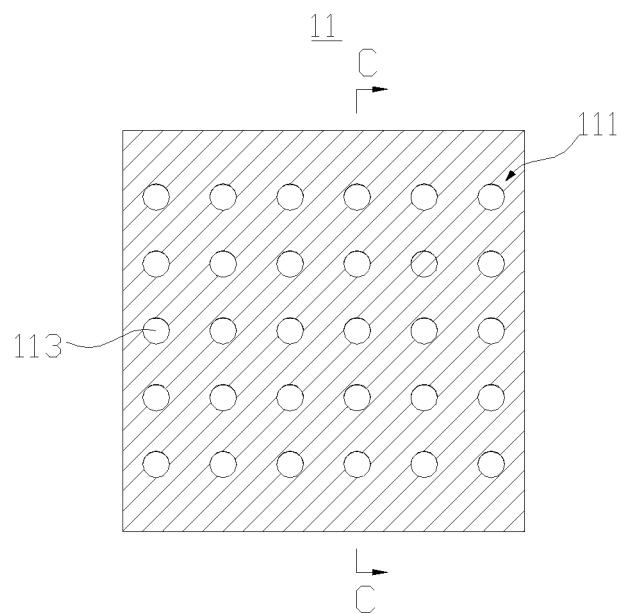
FIG. 11 is a sectional view of the cooling device provided by further some embodiments of the present application.
Figure 12:
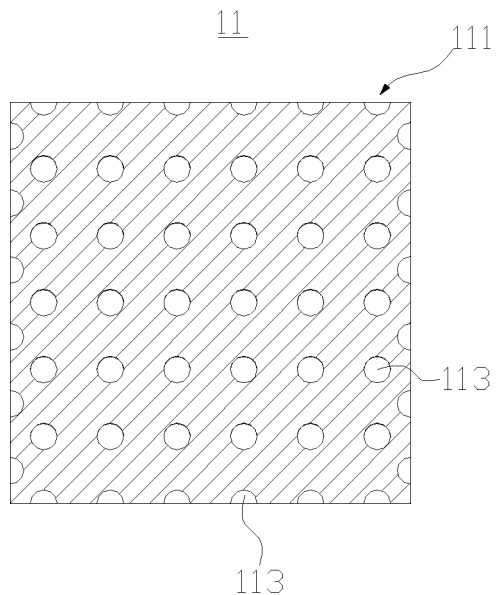
FIG. 12 is a sectional view of the cooling device provided by yet some embodiments of the present application.

The cooling structure 111 may be in other structure forms. In some embodiments, please refer to FIGS. 10 to 12, FIG. 10 is a sectional view of the cooling device 11 provided by some embodiments of the present application, FIG. 11 is a sectional view of the cooling device 11 provided by further some embodiments of the present application, and FIG. 12 is a sectional view of the cooling device 11 provided by yet some embodiments of the present application. The cooling structure 111 includes a second flow channel 113 for the emissions to pass through, i.e., the cooling device 11 may increase the contact area between the cooling device 11 and flue gas by arranging the second flow channel 113, and the structure is simple. In the process of flowing through the cooling device 11, the emissions may flow through inside the second flow channel 113, bringing convenience for the cooling device 11 to cool the emissions.

As shown in FIG. 10, it is possible that the outer surface of the cooling device 11 is provided with a second flow channel 113 so as to facilitate molding of the second flow channel 113. As shown in FIG. 11, it is also possible that the interior of the cooling device 11 is provided with a second flow channel 113, and in the process of flowing through the cooling device 11, the emissions can directionally flow in the cooling device 11. As shown in FIG. 12, it is further possible that the outer surface of the cooling device 11 and the interior of the cooling device 11 are provided with a second flow channel 113 respectively so as to make full use of the cooling device 11 and increase the contact area between the cooling device 11 and the emissions as far as possible.

Understandably, as shown in FIG. 10, the cross section of the second flow channel 113 formed on the outer surface of the cooling device 11 is open and not closed. As shown in FIG. 11, the cross section of the second flow channel 113 formed in the interior of the cooling device 11 is closed. The cross section mentioned above is a section vertical to the extending direction of the second flow channel 113.

Figure 13:
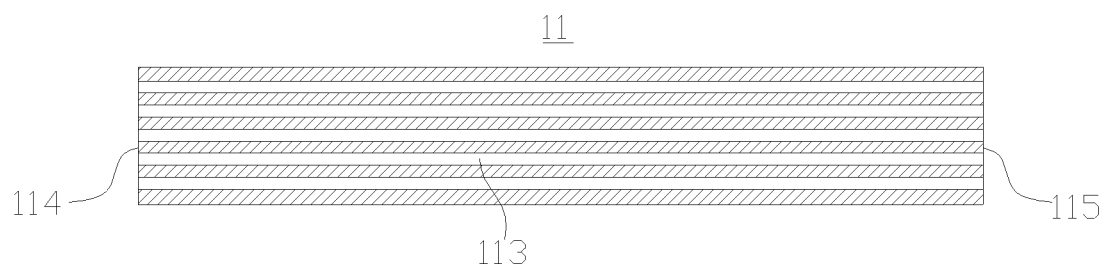
FIG. 13 is a C-C cutaway view of the cooling device provided by some embodiments as shown in FIG. 11.
Figure 14:
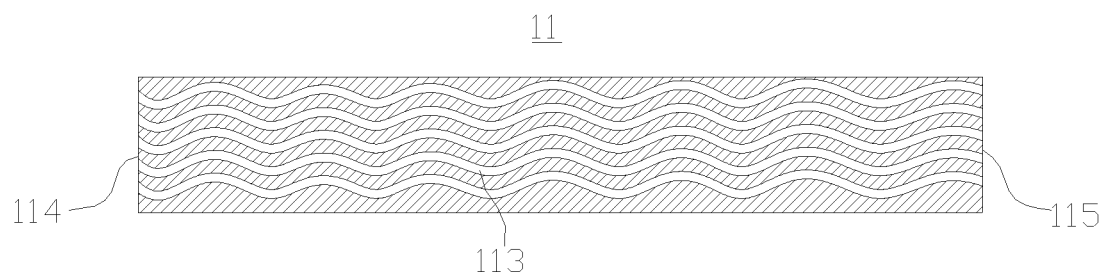
FIG. 14 is a C-C cutaway view of the cooling device provided by further some embodiments as shown in FIG. 11.
Figure 15:
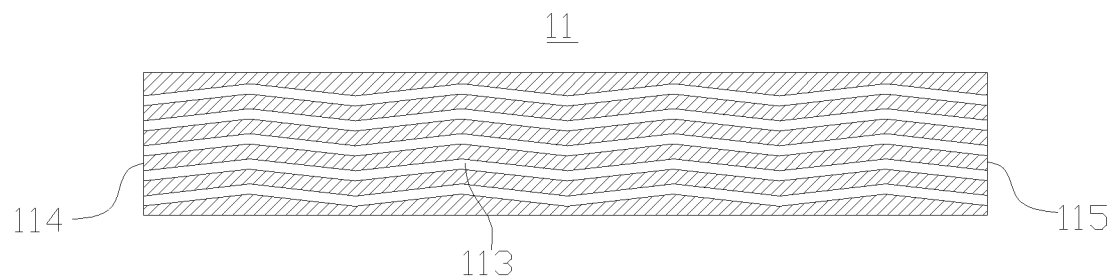
FIG. 15 is a C-C cutaway view of the cooling device provided by yet some embodiments as shown in FIG. 11.
Figure 16:
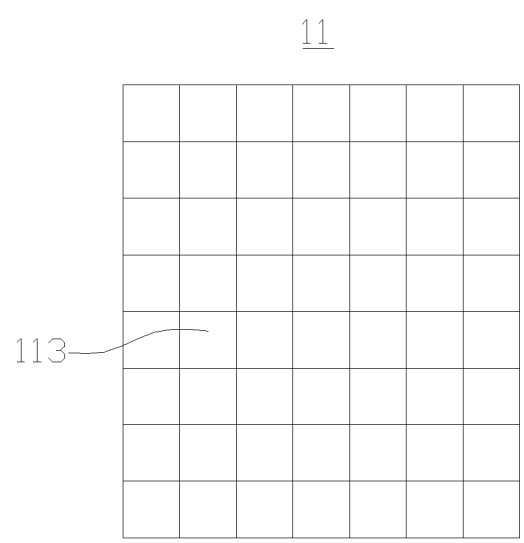
FIG. 16 is a sectional view of the cooling device provided by yet some embodiments of the present application.
Figure 17:
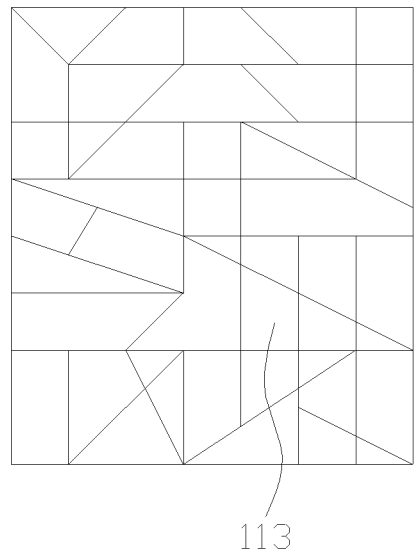
FIG. 17 is a sectional view of the cooling device provided by further some embodiments of the present application.

In some embodiments, please refer to FIGS. 13 to 15, FIG. 13 is a C-C cutaway view of the cooling device 11 provided by some embodiments as shown in FIG. 11, FIG. 14 is a C-C cutaway view of the cooling device 11 provided by further some embodiments as shown in FIG. 11, and FIG. 15 is a C-C cutaway view of the cooling device 11 provided by yet some embodiments as shown in FIG. 11. The cooling device 11 includes a first end 114 and a second end 115 opposite to each other in the extending direction of the first flow channel 14, the second flow channel 113 runs through the first second 114 and the second end 115, i.e., in the process of flowing through the cooling device 11, the emissions may flow in from one end of the cooling device 11 and flow out from the other end, the duration that the emissions flow in the first flow channel 14 is prolonged, that is to say, the contact duration between the emissions and the cooling device 11 is prolonged, the duration for heat exchange between the emissions and the cooling device 11 is prolonged, and the cooling capacity of the cooling device 11 is improved.

Illustratively, the cooling device 11 is a rod-like component arranged along the extending direction of the first flow channel 14.

The size of an outer contour of the cooling device 11 is matched with the size of an inner contour of the first flow channel 14. That is to say, as there is no gap between the cooling device 11 and the wall surface of the first flow channel 14, the emissions have no choice but to flow through the cooling device 11 via the second flow channel 113. For example, if the cooling device 11 is of a cylindrical structure arranged along the extending direction of the first flow channel 14, the outer diameter of the cooling device 11 is matched with the inner diameter of the first flow channel 14. Of course, it is also possible that if there is a gap between the cooling device 11 and the wall surface of the first flow channel 14, the emissions can flow through the cooling device 11 via the gap and the second flow channel 113.

In some embodiments, the second flow channel 113 of the cooling device 11 extends in a shape of a straight line, a curved line or a fold line. As shown in FIG. 13, if the second flow channel 113 of the cooling device 11 extends in a shape of a straight line, the second flow channel 113 with such a structure is simple to mold, and the processing cost is low. As shown in FIGS. 14 and 15, if the second flow channel 113 extends in a shape of a curved line or a fold line, this structure is capable of expanding the flowing path of the emissions in the second flow channel 113, and the contact duration between the emissions and the cooling device 11 is further prolonged.

It should be noted that, in the case where the second flow channel 113 of the cooling device 11 extends in a shape of a curved line, the second flow channel 113 may extend in a shape of a curved line in a plane, that is to say, the center axis of the second flow channel 113 is located in one plane. The second flow channel 113 may extend in a shape of a curved line in a space, e.g., a spiral line. In FIG. 14, the second flow channel 113 may extend in a shape of a curved line in a plane. In the case where the second flow channel 113 of the cooling device 11 extends in a shape of a straight line, the extending direction of the second flow channel 113 and the extending direction of the first flow channel 14 may be consistent, or have an included angle of more than zero degree. Illustratively, as shown in FIG. 13, the extending direction of the second flow channel 113 and the extending direction of the first flow channel 14 are consistent. As shown in FIGS. 13 to 15, each second flow channel 113 is formed in the cooling device 11.

Besides, the cross section of the second flow channel 113 is varied in shape, which is not limited by the embodiments of the present application. For example, as shown in FIGS. 11 to 13, the cross section of the second flow channel 113 is circular. For another example, please refer to FIG. 16, it shows a sectional view of the cooling device 11 provided by yet some embodiments of the present application, and the cross section of the second flow channel 113 is rectangular. For yet another example, please refer to FIG. 17, it shows a sectional view of the cooling device 11 provided by further some embodiments of the present application, in the cooling device 11, the cross sections of at least a portion of the second flow channels 113 are different, and the cross section of each second flow channel 113 may be selected from at least two of rectangle, trapezoid, triangle and the like.

In the embodiments of the present application, there is one or a plurality of second flow channels 113 in the cooling structure 111. FIGS. 10 to 17 show the case that the cooling structure 111 includes a plurality of second flow channels 113 therein. When the cooling structure 111 includes a plurality of second flow channels 113, the plurality of second flow channels 113 are independent from each other, and at least two second flow channels 113 are communicated with each other.

In the case where a plurality of second flow channels 113 in the cooling structure 111 are independent from each other, the cooling device 11 is of a whole structure, and as shown in FIGS. 10 to 17, a plurality of second flow channels 113 are directly formed on the cooling device 11. The cooling device 11 may be of a split structure, i.e., the cooling device 11 is divided into a plurality of portions, and each portion is internally provided with a second flow channel 113.

Figure 18:
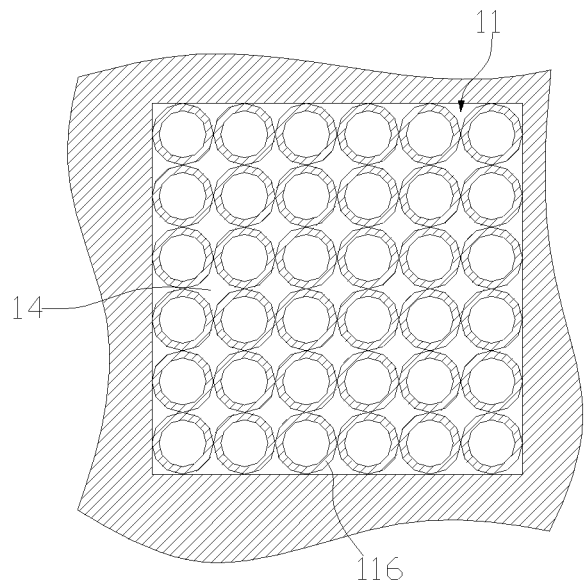
FIG. 18 is a sectional view of the cooling device provided by some embodiments of the present application disposed in the first flow channel.

In some embodiments of the present application, please refer to FIG. 18, it shows a sectional view of the cooling device 11 provided by some embodiments of the present application disposed in the first flow channel 14, the cooling device 11 is of a split structure, the cooling device 11 includes a plurality of cooling pipes 116, and the interior of each cooling pipe 116 is provided with a second flow channel 113. That is to say, a plurality of cooling pipes 116 internally provided with second flow channels 113 serve as cooling devices 11 to cool the emissions, the whole structure is simple, and the manufacturing difficulty of the cooling device 11 is reduced. In addition, gaps for the emissions to pass through are formed among the cooling pipes 116, that is to say, in the process of flowing through the cooling device 11, the emissions contact not only the inner walls of the cooling pipes 116 but also the outer walls of the cooling pipes 116, and the cooling device 11 with such a structure has a good cooling capability to the emissions.

The plurality of cooling pipes 116 in the cooling device 11 are directly stacked in the first flow channel 14, and the cooling pipes 116 abut against each other but are unfixed. Or the plurality of cooling pipes 116 are fixed into a whole and then integrally mounted in the first flow channel 14. Illustratively, each of the plurality of cooling pipes 116 is fixed by welding or sticking.

Figure 19:
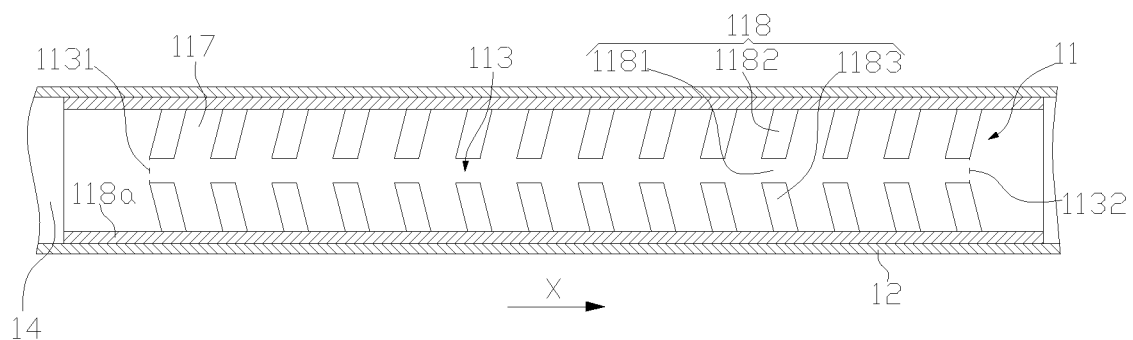
FIG. 19 is a schematically structural diagram of the cooling device provided by further some embodiments of the present application disposed in the first flow channel.

In some embodiments, please refer to FIG. 19, it shows a schematically structural diagram of the cooling device 11 provided by further some embodiments of the present application disposed in the first flow channel 14. The cooling structure 111 further includes a retention space 117. The retention space 117 is communicated with the second flow channel 113. The retention space 117 is used for retention of the emissions. The term "retention" mentioned above means temporary stay.

The retention space 117 is used for retention of the emissions. When the emissions flow in the second flow channel 113, the emissions may flow into the retention space 117 and temporarily stay in the retention space 117, and the duration for heat exchange between the emissions and the cooling device 11 is prolonged.

In the embodiment, an interior and/or an outer surface of the cooling device 11 is provided with a second flow channel 113. There may be one or a plurality of second flow channels 113 in the cooling structure 111. Illustratively, in FIG. 19, there is one second flow channel 113 in the cooling device 11, and the second flow channel 113 is formed at the interior of the cooling device 11.

There may be one or a plurality of retention spaces 117 communicated with the second flow channel 113 in the cooling structure 111.

In some embodiments, the cooling structure 111 includes a plurality of retention spaces 117 distributed at intervals along the extending direction of the second flow channel 113.

In the process of flowing in the second flow channel 113, the emissions may enter into the plurality of retention spaces 117. The plurality of retention spaces 117 can finish multiple times of retention for the emissions, and the duration for heat exchange between the emissions and the cooling device 11 can be further prolonged.

In some embodiments, please continue to refer to FIG. 19, the retention space 117 is arranged obliquely from a position vertical to the extending direction of the second flow channel 113 to a flowing direction X of the emissions in the second flow channel 113.

Owing to oblique arrangement of the retention space 117, the emissions are made easily to flow into the retention space 117 from the interior of the second flow channel 113, but difficulty to flow into the second flow channel 113 from the retention space 117, thereby prolonging the retention duration of the emissions in the retention space 117.

Where, the second flow channel 113 has an inlet end 1131 and an outlet end 1132. The flowing direction X of the emissions in the second flow channel 113 refers to a direction that the inlet end 1131 points to the outlet end 1132. The retention space 117 is arranged obliquely from a position vertical to the extending direction of the second flow channel 113 to the flowing direction X of the emissions in the second flow channel 113. That is to say, the portion connected with the second flow channel 113, of the retention space 117 is closer to the inlet end 1131 than the other portions of the retention space 117.

In the embodiment, the retention space 117 may be a duct on the wall surface of the second flow channel 113 or a space encircling the second flow channel 113.

In some embodiments, please continue to refer to FIG. 19, the cooling device 11 may include a plurality of first cooling elements 118. The plurality of first cooling elements 118 are distributed at intervals along the extending direction of the first flow channel 14. Each first cooling element 118 is provided with a first opening 1181 for the emissions to pass through. The first openings 1181 of the plurality of first cooling elements 118 are communicated so as to form second flow channels 113. A retention space 117 is formed between every two adjacent first cooling elements 118. The cooling device 11 with such a structure is simple in structure, and the molding difficulty of the first flow channel 14 and the retention space 117 is effectively reduced.

It should be noted that, the first cooling elements 118 can be directly fixed on the wall surface of the first flow channel 14; or the plurality of first cooling elements 118 are connected into a whole via first connectors 118a and then are integrally mounted in the first flow channel 14. For example, as shown in FIG. 19, the cooling device 11 further includes first connectors 118a, and each first cooling element 118 is connected to the first connector 118a. Illustratively, the first connector 118a is of a hollow tubular structure. The first connector 118a is arranged in the first flow channel 14. The first cooling element 118 is fixed on the inner wall of the first connector 118a.

In some embodiments, in FIG. 19, the first cooling element 118 includes a first cooling plate 1182 and a second cooling plate 1183. The first cooling plate 1182 and the second cooling plate 1183 are oppositely arranged on the inner wall of the first connector 118a. A first opening 1181 is formed between the first cooling plate 1182 and the second cooling plate 1183, a retention space 117 is formed between every two adjacent first cooling plates 1182, and a retention space 117 is formed between every two adjacent second cooling plates 1183.

In other embodiments, the first cooling element 118 is an annular plate, and a retention space 117 is formed between every two adjacent first cooling elements 118, i.e., the retention space is a space encircling the second flow channel 113.

It is seen from the above embodiments that, the second flow channel 113 may be formed on the outer surface and/or at the interior of the cooling device 11. Of course, arrangement of the second flow channel 113 is not limited thereby.

Figure 20:
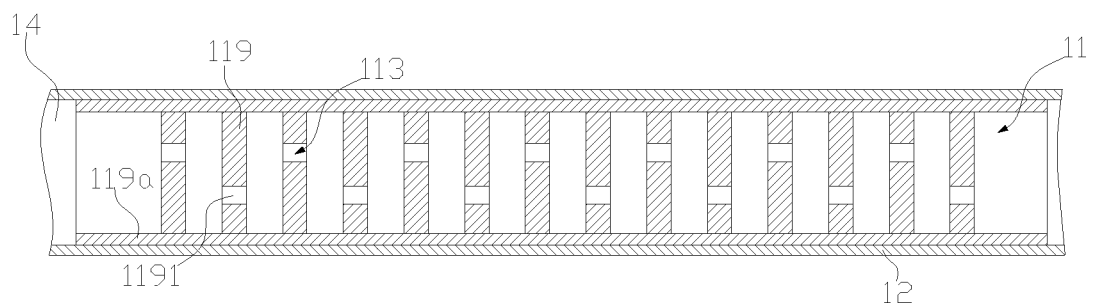
FIG. 20 is a schematically structural diagram of the cooling device provided by yet some embodiments of the present application disposed in the first flow channel.
Figure 21:
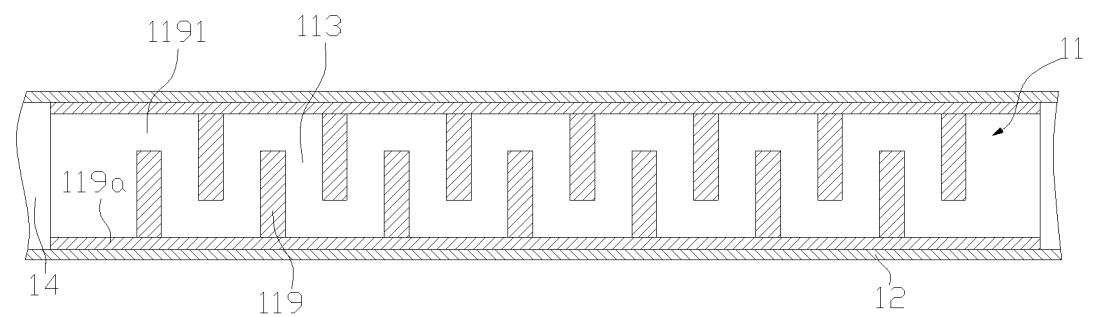
FIG. 21 is a schematically structural diagram of the cooling device provided by further some embodiments of the present application disposed in the first flow channel.

In some embodiments of the present application, please refer to FIGS. 20 to 21, FIG. 20 shows a schematically structural diagram of the cooling device 11 provided by yet some embodiments of the present application disposed in the first flow channel 14, and FIG. 21 shows a schematically structural diagram of the cooling device 11 provided by further some embodiments of the present application disposed in the first flow channel 14. The cooling device 11 includes a plurality of second cooling elements 119. The plurality of second cooling elements 119 are distributed at intervals along the extending direction of the first flow channel 14. Each second cooling element 119 is provided with a second opening 1191 for the emissions to pass through. Projections of the second openings 1191 of every two adjacent cooling elements are staggered with each other in the extending direction of the first flow channel 14. The second openings 1191 of the plurality of second cooling elements 119 are communicated to form the second flow channels 113.

Projections of the second openings 1191 of every two adjacent second cooling elements 119 are staggered with each other in the extending direction of the first flow channel 14, so that the second flow channel 113 is distributed in a zigzag shape. After passing through the second opening 1191 of one second cooling element 119, the emissions change a flowing direction under the blocking effect of next second cooling element 119, therefore, the flowing path of the emissions is expanded, and the duration for heat exchange between the emissions and the cooling device 11 is prolonged.

It should be noted that, projections of the second openings 1191 of every two adjacent second cooling elements 119 are staggered with each other in the extending direction of the first flow channel 14. Staggered arrangement may refer to partially staggered arrangement, i.e., projections of two second openings 1191 are partially overlapped in the extending direction of the first flow channel 14, or staggered arrangement may refer to wholly staggered arrangement, i.e., the projections of the two second openings 1191 do not have an overlapped portion in the extending direction of the first flow channel 14.

In the embodiments of the present application, the second cooling elements 119 can be directly fixed on the wall surface of the first flow channel 14. Or, the plurality of second cooling elements 119 are connected into a whole via second connectors 119a, and then are integrally mounted in the first flow channel 14. For example, as shown in FIGS. 20 to 21, the cooling device 11 further includes a second connector 119a, and each second cooling element 119 is connected to the second connector 119a. Illustratively, the second connector 119a is of a hollow tubular structure, the second connector 119a is distributed in the first flow channel 14, and the second cooling element 119 is fixed on the inner wall of the second connector 119a.

Illustratively, in FIGS. 20 to 21, the second cooling element 119 is a platy element. Projections of the second openings 1191 of every two adjacent second cooling elements 119 are wholly staggered with each other along the extending direction of the first flow channel 14. As shown in FIG. 20, the second openings 1191 are holes in the second cooling elements 119. As shown in FIG. 21, the second openings 1191 may be openings jointly defined by the end of the second cooling element 119 and the inner wall of the second connector 119a.

Figure 22:
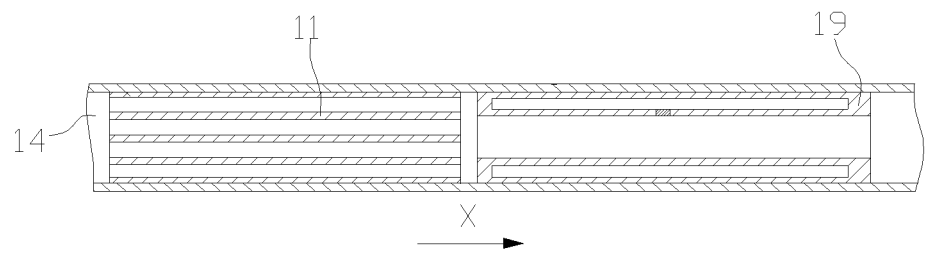
FIG. 22 is a schematic diagram of a fire control mechanism and the cooling device provided by some embodiments of the present application disposed in the first flow channel.
Figure 23:
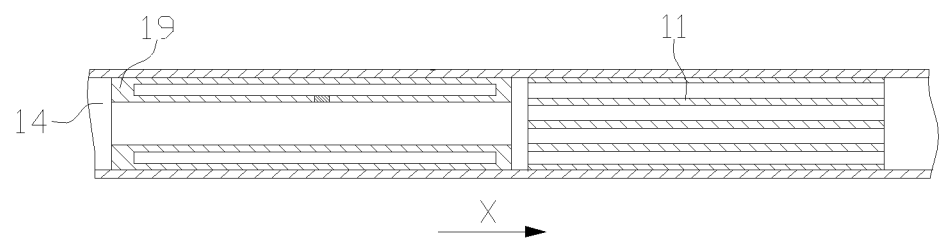
FIG. 23 is a schematic diagram of the fire control mechanism and the cooling device provided by further some embodiments of the present application disposed in the first flow channel.
Figure 24:
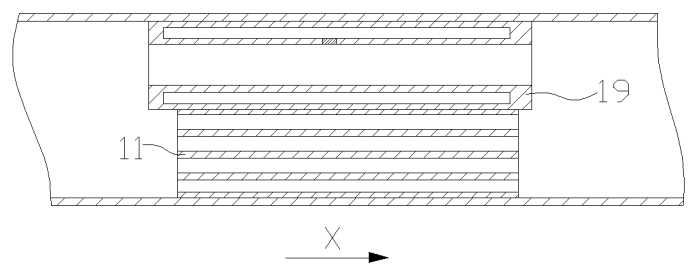
FIG. 24 is a schematic diagram of the fire control mechanism and the cooling device provided by yet some embodiments of the present application disposed in the first flow channel.

In some embodiments, please refer to FIGS. 22 to 24, FIG. 22 is a schematic diagram of a fire control mechanism 19 and the cooling device 11 provided by some embodiments of the present application disposed in the first flow channel 14, FIG. 23 is a schematic diagram of the fire control mechanism 19 and the cooling device 11 provided by further some embodiments of the present application disposed in the first flow channel 14, and FIG. 24 is a schematic diagram of the fire control mechanism 19 and the cooling device 11 provided by yet some embodiments of the present application disposed in the first flow channel 14. The box body 10 further includes a fire control mechanism 19. The fire control mechanism 19 is arranged in the first flow channel 14 and configured to release a fire control medium into the first flow channel 14 when thermal runaway of the battery cell 30 takes place, the fire control medium and the emissions are mixed to cool the emissions and reduce a concentration of the emissions, thereby achieving flame retardance.

Illustratively, the fire control medium may refer to fire control gases, or fire control solids or fire control liquids capable of generating the fire control gases. The fire control solids or fire control liquids can generate the fire control gases by phase change, or generate the fire control gases by chemical reactions.

The fire control gas includes but not limited to uninflammable gases such as inert gases, carbon dioxide gas, heptafluoropropane gas, and sulfur hexafluorides capable of putting out a fire.

The fire control mechanism 19 may have a plurality of arrangement forms. For example, as shown in FIG. 22, in the flowing direction X of the emissions in the first flow channel 14, the fire control mechanism 19 is arranged at a downstream of the cooling device 11, and the emissions generated by thermal runaway of the battery cell 30 are cooled by the cooling device 11 and then mixed with the fire control medium released by the fire control mechanism 19. For another example, as shown in FIG. 23, in the flowing direction X of the emissions in the first flow channel 14, the fire control mechanism 19 is arranged at an upstream of the cooling device 11, and the emissions generated by thermal runaway of the battery cell 30 is first mixed with the fire control medium released by the fire control mechanism 19 and then cooled by the cooling device 11. For further another example, as shown in FIG. 24, the fire control mechanism 19 and the cooling device 11 are stacked in a direction vertical to the flowing direction X. Where the flowing direction X is the flowing direction X of the emissions in the first flow channel 14, and the flowing direction X of the emissions in the first flow channel 14 is the flowing direction X of the emissions in the second flow channel 113.

In some embodiments, the box body 10 further includes a detecting device 20. The detecting device 20 is arranged in the first flow channel 14 and used for detecting information parameters of the emissions in the first flow channel 14. The fire control mechanism 19 is used for releasing a fire control medium into the first flow channel 14 when the information parameters reach preset values.

The detecting device 20 may be a concentration sensor, a temperature sensor or the like. If the detecting device 20 is a concentration sensor, the detecting device 20 may detect a gas concentration of the emissions in the first flow channel 14, and when the gas concentration reaches a preset value, the fire control mechanism 19 releases a fire control medium into the first flow channel 14, thus release of the fire control medium by the fire control mechanism 19 is achieved. If the detecting device 20 is a temperature sensor, the detecting device 20 can detect a temperature of the emissions in the first flow channel 14, when the temperature reaches a preset value, the fire control mechanism 19 releases a fire control medium into the first flow channel 14, thus release of the fire control medium by the fire control mechanism 19 is achieved.

Figure 25:
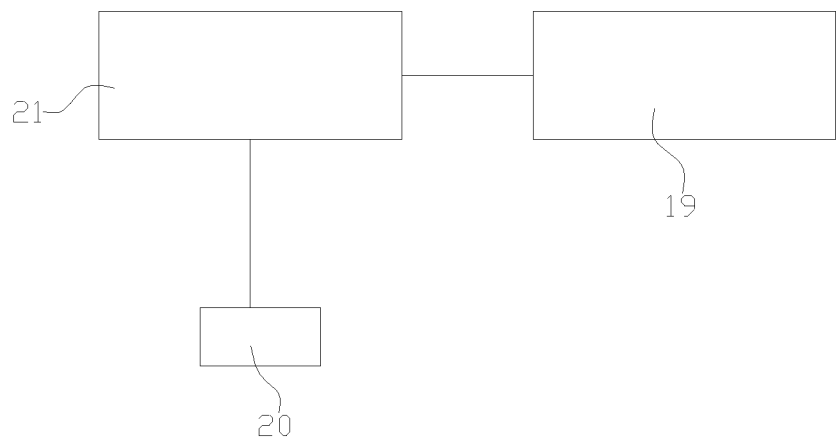
FIG. 25 is a control schematic diagram of the fire control mechanism provided by some embodiments of the present application.

Please refer to FIG. 25, it shows a control principle diagram of the fire control mechanism 19 provided by some embodiments of the present application. The detecting device 20 and the fire control mechanism 19 are electrically connected with a control system 21. When the detecting device 20 detects that the information parameters of the emissions in the first flow channel 14 reach preset values, the control system 21 controls the fire control mechanism 19 to release a fire control medium into the first flow channel 14, thus automatic release of the fire control medium by the fire control mechanism 19 is achieved. Illustratively, the control system 21 is a battery management system (BMS).

Figure 26:
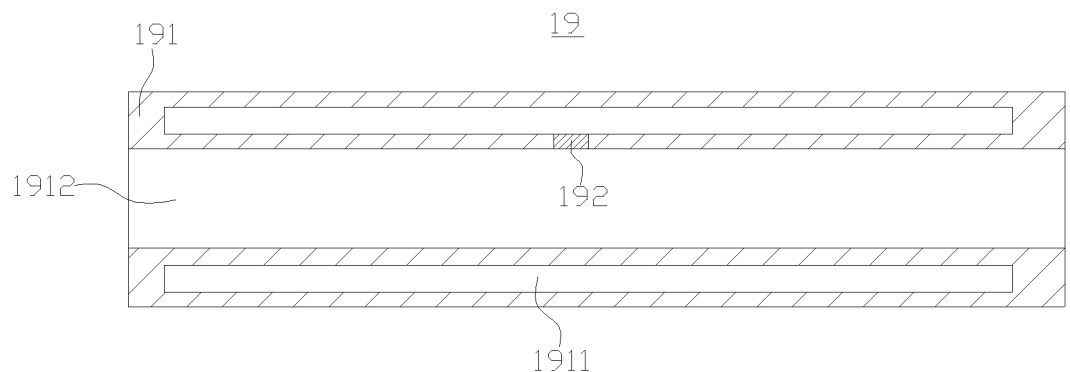
FIG. 26 is a schematically structural diagram of the fire control mechanism of FIGS. 22 to 24.

In some embodiments, please refer to FIG. 26, FIG. 26 is a schematically structural diagram of the fire control mechanism 19 as shown in FIGS. 22 to 24, the fire control mechanism 19 includes a housing 191 and a triggering device 192. The triggering device 192 is mounted on the housing 191. The housing 191 is internally provided with an accommodating cavity 1911 and a third flow channel 1912. The accommodating cavity 1911 is used for accommodating a fire control medium; the third flow channel 1912 is used for the emissions to pass through. The triggering device 192 is started when the detecting device 20 detects that the information parameters of the emissions in the first flow 14 reach preset values, so the fire control medium in the accommodating cavity 1911 enters into the third flow channel 1912 and is mixed with the emissions.

Where, the triggering device 192 and the control system 21 are electrically connected. Illustratively, the triggering device 192 is an electric switching valve.

Figure 27:
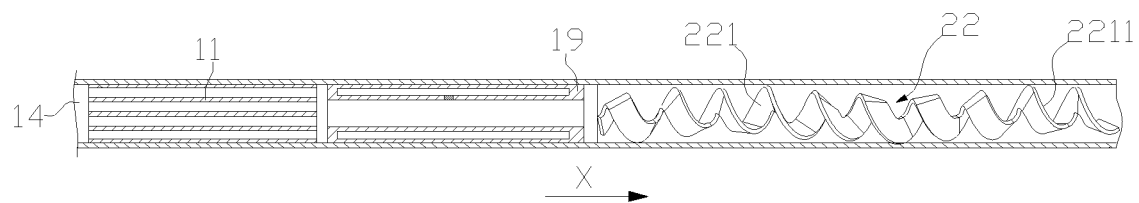
FIG. 27 is a schematically structural diagram of the fire control mechanism, the cooling device and a mixing device provided by some embodiments of the present application disposed in the first flow channel.

Besides, in some embodiments, please refer to FIG. 27, it shows a schematically structural diagram of the fire control mechanism 19, the cooling device 11 and a mixing device 22 provided by some embodiments of the present application. The box body 10 further includes a mixing device 22. The mixing device 22 is arranged in the first flow channel 14 and used for mixing the emissions and the fire control medium prior to being discharged from the first flow channel 14, so the emissions and the fire control medium can be mixed sufficiently, and the risk of an over-high local concentration is lowered.

Understandably, in the flowing direction X of the emissions in the first flow channel 14, the mixing device 22 is at the downstream of the fire control mechanism 19. The mixing device 22 is at the upstream of the cooling device 11 or at the downstream of the cooling device 11. Illustratively, in FIG. 27, in the flowing direction X of the emissions in the first flow channel 14, the cooling device 11 is at the upstream of the fire control mechanism 19. The fire control mechanism 19 is at the upstream of the mixing device 22.

In some embodiments, the mixing device 22 may include a barrier structure 221. The barrier structure 221 is used for blocking the emissions and the fire control medium and changing a flowing direction X, so the emissions and the fire control medium are mixed prior to being discharged from the first flow channel 14.

By blocking the emissions and the fire control medium and changing the flowing direction X, the emissions and the fire control medium are mixed by the barrier structure 221, so the emissions and the fire control medium can be sufficiently mixed.

In some embodiments, please continue to refer to FIG. 27, the barrier structure 221 includes a helical blade 2211 with its central axis coincident with or parallel to a central axis of the first flow channel 14.

When the emissions and the fire control medium flow through the helical blade 2211, the emissions and the fire control medium flow in the form of a helical line under the effect of the helical blade 2211, so the emissions and the fire control medium can be sufficiently mixed under the effect of the helical blade 2211.

In the barrier structure 221, there may be one or a plurality of helical blades 2211. In some embodiments, when there are a plurality of helical blades 2211, the plurality of helical blades 2211 are arranged along the extending direction of the first flow channel 14, every two adjacent helical blades 2211 are opposite in directions of turning. Due to this structure, in the process of flowing through the barrier structure 221, the emissions and the fire control medium flow in the form of helical lines with different directions of turning under the effect of the helical blades 2211 with different directions of turning, the emissions and the fire control medium can be sufficiently mixed by the barrier structure 221.

Figure 28:
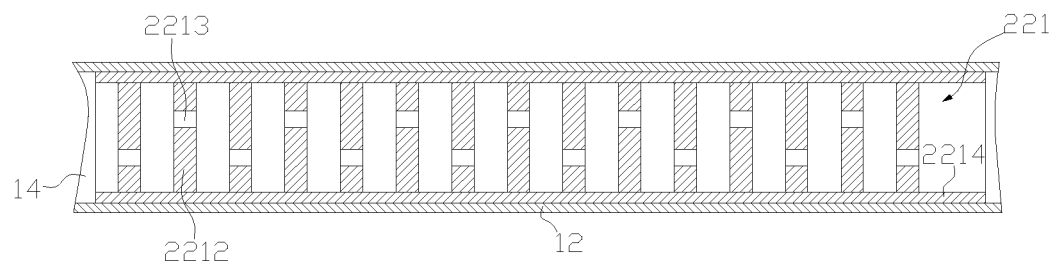
FIG. 28 is a schematically structural diagram of a barrier structure provided by some embodiments of the present application.
Figure 29:
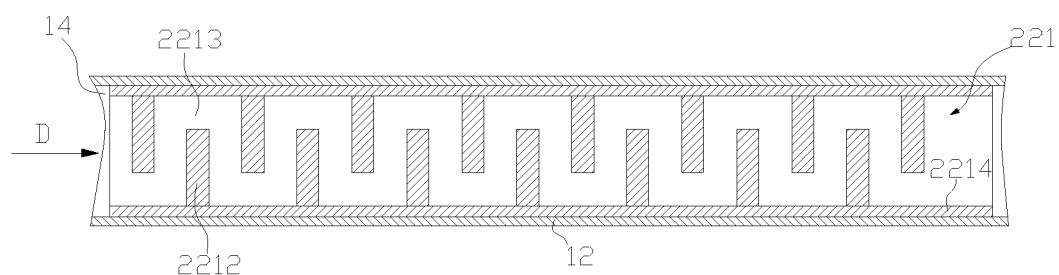
FIG. 29 is schematically structural diagram of the barrier structure provided by further some embodiments of the present application.

In some embodiments, please refer to FIGS. 28 to 29, FIG. 28 is a schematically structural diagram of the barrier structure 221 provided by some embodiments of the present application, and FIG. 29 is a schematically structural diagram of the barrier structure 221 provided by further some embodiments of the present application. The barrier structure 221 includes a plurality of blocking elements 2212. The plurality of blocking elements 2212 are distributed at intervals along the extending direction of the first flow channel 14, each blocking element 2212 is provided with a third opening 2213 thereon, and projections of every two adjacent third openings 2213 are staggered with each other in the extending direction of the first flow channel 14.

After passing through a third opening 2213 of one blocking element 2212, the emissions and the fire control medium change a flowing direction under the blocking effect of next blocking element 2212, therefore, the emissions and the fire control medium can be sufficiently mixed under the blocking effect of the blocking element 2212. The barrier structure 221 making use of a plurality of blocking elements 2212 is simple, and an effect of mixing the emissions and the fire control medium is good. Besides, the blocking element 2212 with such a structure is helpful to expand the flowing path of the emissions and the fire control medium, and the cooling effect to the emissions is enhanced.

It should be noted that, the projections of the third openings 2213 of every two adjacent blocking elements 2212 are staggered with each other in the extending direction of the first flow channel 14. Staggered arrangement may refer to partially staggered arrangement, i.e., projections of two third openings 2213 are partially overlapped in the extending direction of the first flow channel 14; staggered arrangement may refer to wholly staggered arrangement, i.e., the projections of the two third openings 2213 do not have an overlapped portion in the extending direction of the first flow channel 14.

In the embodiments of the present application, the blocking element 2212 can be directly fixed on the wall surface of the first flow channel 14; or the plurality of blocking elements 2212 are connected into a whole via third connectors 2214, and then are integrally mounted in the first flow channel 14. For example, as shown in FIGS. 28 to 29, the barrier structure 221 further includes a third connector 2214, and each blocking element 2212 is connected to the third connector 2214. Illustratively, the third connector 2214 is of a hollow tubular structure. The third connector 2214 is arranged in the first flow channel 14. The blocking element 2212 is fixed on the inner wall of the third connector 2214.

Illustratively, in FIGS. 28 to 29, the blocking element 2212 is a platy element. Projections of the third openings 2213 of every two adjacent blocking elements 2212 are wholly staggered with each other along the extending direction of the first flow channel 14. As shown in FIG. 28, the third openings 2213 are holes in the blocking elements 2212. As shown in FIG. 29, the third openings 2213 may be openings jointly defined by the end of the blocking element 2212 and the inner wall of the third connector 2214.

Figure 30:
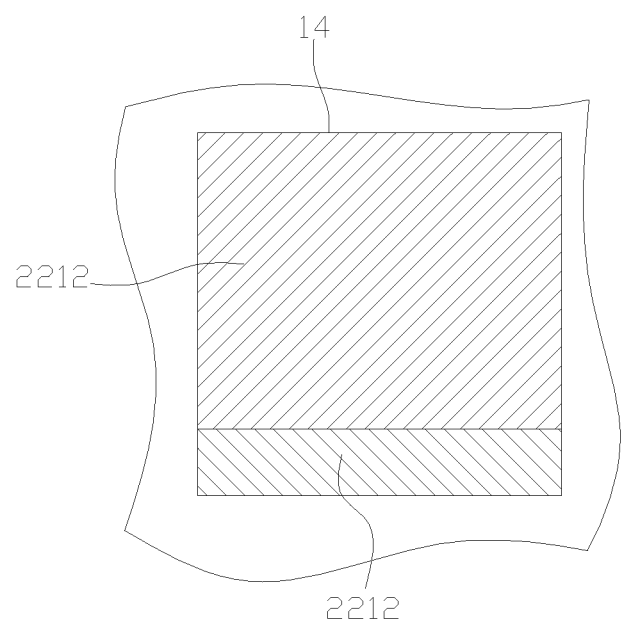
FIG. 30 is a D-directional view of the barrier structure as shown in FIG. 29.

In some embodiments, please refer to FIG. 30, it shows a D-directional view of the barrier structure 221 as shown in FIG. 29. The D-directional view is a view viewed from a direction D of FIG. 29. A projection of the barrier structure 221 in the extending direction of the first flow channel 14 covers a projection of the first flow channel 14 in the extending direction. The term "covering" refers to complete covering. The barrier structure 221 with such a structure is capable of well blocking the emissions and the fire control medium, so the emissions and the fire control medium can be sufficiently mixed.

In some embodiments, the barrier structure 221 may include a helical blade 2211 as shown in FIG. 27 and a plurality of blocking elements 2212 as shown in FIGS. 28 to 29. For example, a plurality of blocking elements 2212 and a helical blade 2211 are arranged in the first flow channel 14. In the flowing direction X of the emissions in the first flow channel 14, the helical blade 2211 is at the downstream of the plurality of blocking elements 2212.

It should be noted that, in other embodiments, the mixing device 22 may be the barrier structure 221 mentioned in each embodiment above, or may be of other structures. For example, the mixing device 22 may include a movable piece rotatably or movably arranged in the first flow channel 14. By rotation or movement of the movable piece, mixing of the fire control medium and the emissions is achieved.

Figure 31:
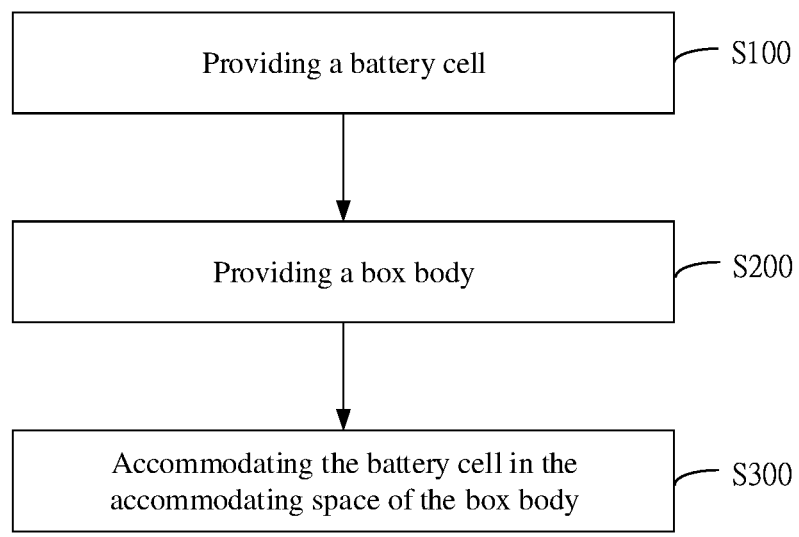
FIG. 31 is a schematically process diagram of a manufacturing method of the battery provided by some embodiments of the present application.

Besides, in some embodiments, please refer to FIG. 31, it shows a schematic process diagram of a manufacturing method of the battery 100 provided by some embodiments of the present application. The manufacturing method of the battery 100, includes:

S100: providing a battery cell 30;

S200: providing a box body 10, the box body 10 comprising:

a plurality of walls 12 enclosed to form an accommodating space 13 for accommodating the battery cell 30, an interior of at least one wall 12 being provided with a first flow channel 14, and the first flow channel 14 being used for discharging the emissions generated by thermal runaway of the battery cell 30 out of the box body 10; and a cooling device 11 arranged in the first flow channel 14 and used for cooling the emissions flowing through the cooling device 11;

where the cooling device 11 includes a cooling structure 111 used for increasing a contact area between the emissions and the cooling device 11;

S300: accommodating the battery cell 30 in the accommodating space 13 of the box body 10.

If there is any portion that is not described in detail in this embodiment, please refer to the abovementioned embodiments.

It should be noted that, in case of no conflicts, the embodiments of the present application and features in the embodiments can be mutually combined.

The above embodiments are used only to explain the technical solutions of the present application and are not intended to restrict the present application. For those skilled in the art, any alternations and variations will be appreciated. All modifications, equivalent replacements, improvements and the like made within the spirit and principles of the present application can be covered by the protection scope of the present application.

What is claimed is:

1. A box body used for a battery comprising a battery cell, comprising:
    a plurality of walls, the plurality of walls enclosing an accommodating space for accommodating the battery cell, an interior of at least one of the plurality of the walls being provided with a first flow channel, the first flow channel being configured to discharge emissions generated by thermal runaway of the battery cell out of the box body; and
    a cooling device, arranged in the first flow channel, the cooling device being configured to cool the emissions flowing through the cooling device;
    wherein the cooling device comprises a cooling structure being configured to increase a contact area between the emissions and the cooling device;
    wherein the cooling device comprises a plurality of cooling pipes, and an interior of each of the plurality of cooling pipes is provided with a second flow channel.

2. The box body according to claim 1, wherein the cooling structure comprises the second flow channel for the emissions to pass through.

3. The box body according to claim 2, wherein an outer surface and/or an interior of the cooling device is provided with the second flow channel.

4. The box body according to claim 2, wherein the cooling device comprises a first end and a second end opposite to each other in an extending direction of the first flow channel, and the second flow channel runs through the first end and the second end.

5. The box body according to claim 2, wherein the second flow channel extends in a shape of a straight line, a curved line or a fold line.

6. The box body according to claim 2, wherein the cooling structure comprises a plurality of second flow channels independent from each other.

7. The box body according to claim 2, wherein the cooling structure further comprises a retention space;
    the retention space is communicated with the second flow channel, and the retention space is configured for retention of the emissions.

8. The box body according to claim 7, wherein the cooling structure comprises a plurality of retention spaces distributed at intervals along an extending direction of the second flow channel.

9. The box body according to claim 7, wherein the retention space is arranged obliquely from a position vertical to an extending direction of the second flow channel to a flowing direction of the emissions in the second flow channel.

10. The box body according to claim 7, wherein the cooling device comprises a plurality of first cooling elements;
    the plurality of first cooling elements are arranged at intervals along the extending direction of the first flow channel; the plurality of first cooling elements are provided with first openings for the emissions to pass through thereon; the first openings of the plurality of first cooling elements are communicated so as to form the second flow channel; the retention space is formed between every two adjacent first cooling elements of the plurality of first cooling elements.

11. The box body according to claim 2, wherein the cooling device comprises a plurality of second cooling elements;
    the plurality of second cooling elements are arranged at intervals along an extending direction of the first flow channel; the plurality of second cooling elements are provided with second openings for the emissions to pass through; projections of the second openings of every two adjacent cooling elements of the plurality of second cooling elements in the extending direction of the first flow channel are staggered with each other; the second openings of the plurality of second cooling elements are communicated so as to form the second flow channel.

12. The box body according to claim 1, wherein the box body further comprises:
    a fire control mechanism, arranged in the first flow channel, wherein the fire control mechanism is configured to release a fire control medium into the first flow channel when thermal runaway of the battery cell takes place.

13. The box body according to claim 12, wherein the box body further comprises: a mixing device, arranged in the first flow channel, wherein the mixing device is configured to enable the emissions and the fire control medium to be mixed prior to being discharged from the first flow channel.

14. The box body according to claim 13, wherein the mixing device comprises a barrier structure, the barrier structure being configured to block and change a flowing direction of both the emissions and the fire control medium so as to enable the emissions and the fire control medium to be mixed prior to being discharged from the first flow channel.

15. The box body according to claim 14, wherein the barrier structure comprises a plurality of blocking elements; the plurality of blocking elements are distributed at intervals along an extending direction of the first flow channel, each of the plurality of blocking elements is provided with a third opening thereon, and projections of every two adjacent third openings in the extending direction of the first flow channel are staggered with each other.

16. The box body according to claim 14, wherein a projection of the barrier structure in an extending direction of the first flow channel covers a projection of the first flow channel in the extending direction.

17. The box body according to claim 14, wherein the barrier structure comprises a plurality of helical blades, wherein the plurality of helical blades is arranged along an extending direction of the first flow channel, and every two adjacent helical blades of the plurality of helical blades are opposite in directions of turning.

18. A battery, comprising: a battery cell; and the box body according to claim 1, the battery cell being accommodated within the accommodating space.

19. An electric apparatus, comprising the battery according to claim 18.

* * * * *